(12) United States Patent
Neely et al.

(10) Patent No.: US 7,702,579 B2
(45) Date of Patent: Apr. 20, 2010

(54) INTERACTIVE INVOICER INTERFACE

(75) Inventors: R. Alan Neely, Greensboro, NC (US); Scott Boulette, Greensboro, NC (US); Joshua B. Fallon, Mary Esther, FL (US); Bartholomew Coan, Greensboro, NC (US); James C. Wrather, Greensboro, NC (US)

(73) Assignee: Emergis Technologies, Inc., Longueuil, Quebec (CA)

( * ) Notice: Subject to any disclaimer, the term of this patent is extended or adjusted under 35 U.S.C. 154(b) by 1915 days.

(21) Appl. No.: 09/741,620

(22) Filed: Dec. 19, 2000

(65) Prior Publication Data

US 2002/0077977 A1    Jun. 20, 2002

(51) Int. Cl.
*G06Q 40/00* (2006.01)
(52) U.S. Cl. .............................. 705/40; 705/35; 705/34
(58) Field of Classification Search .................. 705/35, 705/38, 39, 40, 42–44; 704/40
See application file for complete search history.

(56) References Cited

U.S. PATENT DOCUMENTS

| | | | |
|---|---|---|---|
| 3,653,480 A | 4/1972 | Yamamoto et al. ............. 194/4 |
| 4,322,613 A | 3/1982 | Oldenkamp ................. 235/449 |
| 4,544,834 A | 10/1985 | Newport et al. ............. 235/487 |
| 4,649,563 A | 3/1987 | Riskin ......................... 379/97 |
| 4,695,880 A | 9/1987 | Johnson et al. ............... 358/86 |
| 4,711,993 A | 12/1987 | Kosednar et al. ........... 235/380 |
| 4,713,761 A | 12/1987 | Sharpe et al. ............... 364/406 |
| 4,799,156 A | 1/1989 | Shavit et al. ................ 364/401 |
| 4,823,264 A | 4/1989 | Deming ...................... 364/408 |
| 4,859,837 A | 8/1989 | Halpern ...................... 235/380 |
| 4,870,260 A | 9/1989 | Niepolomski et al. ....... 235/381 |
| 4,922,646 A | 5/1990 | Basgal ...................... 43/42.33 |
| 4,947,028 A | 8/1990 | Gorog ........................ 235/381 |
| 4,989,141 A | 1/1991 | Lyons et al. ................ 364/408 |
| 4,992,646 A | 2/1991 | Collin ........................ 235/375 |
| 5,007,084 A | 4/1991 | Materna et al. ............... 380/24 |
| 5,097,115 A | 3/1992 | Ogasawara et al. ......... 235/380 |
| 5,121,945 A | 6/1992 | Thomson et al. ............. 283/58 |
| 5,168,151 A | 12/1992 | Nara .......................... 235/492 |

(Continued)

FOREIGN PATENT DOCUMENTS

AU    199677229    10/1997

(Continued)

OTHER PUBLICATIONS

U.S. Appl. No. 60/167,103.*

(Continued)

*Primary Examiner*—Lalita M Hamilton

(57) ABSTRACT

An automated electronic invoicing and payment consolidation system for providing remote customer review of customer account information from at least two invoicers. In the preferred embodiment, the system includes three primary components: a consolidated invoicer interface; a remote customer interface for accessing the consolidated invoicer interface; and a payment engine. In the preferred embodiment, the consolidated invoicer interface provides at least one access point to each of the invoicers; sets the access point of each of the invoicers for at least one customer; authenticates each of the customers; and automatically requests account information for the customers directly from each of the invoicers. Also, in the preferred embodiment, the payment engine sends the customer payment instructions from the customer directly to each of the invoicers.

153 Claims, 13 Drawing Sheets

U.S. PATENT DOCUMENTS

| | | | |
|---|---|---|---|
| 5,179,584 A | 1/1993 | Tsumura | 379/114 |
| 5,220,501 A | 6/1993 | Lawlor et al. | 364/408 |
| 5,265,033 A | 11/1993 | Vajk et al. | 364/514 |
| 5,283,829 A | 2/1994 | Anderson | 380/24 |
| 5,317,137 A | 5/1994 | Wilkins | 235/380 |
| 5,326,959 A | 7/1994 | Perazza | 235/379 |
| 5,336,870 A | 8/1994 | Hughes et al. | 235/379 |
| 5,383,113 A | 1/1995 | Kight et al. | 364/401 |
| 5,420,405 A | 5/1995 | Chasek | 235/379 |
| 5,465,206 A | 11/1995 | Hilt et al. | 364/406 |
| 5,473,143 A | 12/1995 | Vak et al. | 235/380 |
| 5,483,445 A | 1/1996 | Pickering | 364/406 |
| 5,504,677 A | 4/1996 | Pollin | 364/408 |
| 5,544,086 A | 8/1996 | Davis et al. | 364/408 |
| 5,557,518 A | 9/1996 | Rosen | 364/408 |
| 5,572,004 A | 11/1996 | Raimann | 235/380 |
| 5,572,643 A | 11/1996 | Judson | 395/793 |
| 5,649,117 A | 7/1997 | Landry | 395/240 |
| 5,652,786 A | 7/1997 | Rogers | 379/91.01 |
| 5,671,285 A | 9/1997 | Newman | 380/30 |
| 5,677,955 A | 10/1997 | Doggett et al. | 380/24 |
| 5,699,528 A | 12/1997 | Hogan | 395/240 |
| 5,708,422 A | 1/1998 | Blonder et al. | 340/825.34 |
| 5,727,163 A | 3/1998 | Bezos | 395/227 |
| 5,727,249 A | 3/1998 | Pollin | 705/40 |
| 5,761,650 A | 6/1998 | Munsil et al. | 705/34 |
| 5,790,793 A | 8/1998 | Higley | 395/200.48 |
| 5,826,241 A | 10/1998 | Stein et al. | 705/26 |
| 5,832,460 A | 11/1998 | Bednar et al. | 705/27 |
| 5,873,072 A | 2/1999 | Kight et al. | 705/40 |
| 5,884,288 A | 3/1999 | Chang et al. | 705/40 |
| 5,893,080 A | 4/1999 | McGurl et al. | 705/40 |
| 5,946,669 A | 8/1999 | Polk | 705/40 |
| 5,960,411 A | 9/1999 | Hartman et al. | 705/26 |
| 5,963,925 A | 10/1999 | Kolling et al. | 705/40 |
| 5,978,780 A | 11/1999 | Watson | 705/40 |
| 6,035,285 A | 3/2000 | Schlect et al. | 705/30 |
| 6,044,362 A | 3/2000 | Neely | 705/34 |
| 6,052,674 A * | 4/2000 | Zervides et al. | 705/40 |
| 6,055,567 A | 4/2000 | Ganesan et al. | 709/217 |
| 6,070,150 A | 5/2000 | Remington et al. | 705/34 |
| 6,078,907 A | 6/2000 | Lamm | 705/40 |
| 6,119,107 A | 9/2000 | Polk | 705/40 |
| 6,128,602 A | 10/2000 | Northington et al. | 705/35 |
| 6,128,603 A | 10/2000 | Dent et al. | 705/40 |
| 6,131,115 A | 10/2000 | Anderson et al. | 709/217 |
| 6,188,994 B1 | 2/2001 | Egendorf | 705/40 |
| 6,223,168 B1 | 4/2001 | McGurl et al. | 705/40 |
| 6,285,991 B1 | 9/2001 | Powar | 705/76 |
| 6,289,322 B1 | 9/2001 | Kitchen et al. | 705/40 |
| 6,292,789 B1 | 9/2001 | Schutzer | 705/40 |
| 6,311,170 B1 | 10/2001 | Embrey | 705/40 |
| 6,327,577 B1 | 12/2001 | Garrison et al. | 705/40 |
| 6,334,116 B1 | 12/2001 | Ganesan et al. | 705/34 |
| 6,385,595 B1 | 5/2002 | Kolling et al. | 705/40 |
| 6,493,685 B1 * | 12/2002 | Ensel et al. | 705/40 |
| 6,826,542 B1 * | 11/2004 | Virgin et al. | 705/34 |

FOREIGN PATENT DOCUMENTS

| | | |
|---|---|---|
| AU | 199891076 | 8/1998 |
| JP | 04-303258 | 10/1992 |
| WO | WO90/11572 | 10/1990 |
| WO | WO9116691 | 10/1991 |
| WO | WO97/24688 | 7/1997 |
| WO | WO97/48161 | 12/1997 |
| WO | WO98/07119 | 2/1998 |
| WO | WO 98/26364 A1 | 6/1998 |

OTHER PUBLICATIONS

KeyCorp Selects BillingZone to Deliver B2B Electronic Billing and Payment Service to Corporate Customers; [1] PR Newswire. New York: Oct 24, 2000. p. 1.*

PermitsNOW Launches Next Generation of B-to-G E-Payments PR Newswire. New York: Nov 1, 2000. p. 1.*

The Biller's Guide To Electronic Consumer Bill Payment; NACHA, 1995.

ACH Rules Guide for Direct Payment Programs; NACHA 1995.

Trends, Paperless Bills; PC Magazine, Jul. 1999.

E-Payments in B2B to Grow (Global purchase of goods and services over Internet is expected to increase from relatively low base of $325 billion to nearly $3.5 trillion by 2006). Semiconductor International, v. 25, n. 1, p. 87, Jan. 2002.

Electronic Payment Mechanisms, Roger Clarke, 1995, www.anu.edu.au/people/RogerClarke/EC/EPC.html.

Form-based File Uploan in HTML, E. Nebel et al., Nov. 1995, ftp://ftp.rfc-editor.org/in-notes/rfc1867.txt.

Hypertext Markup Language 2.0, T. Berners-Lee et al., Nov. 1995, ftp://ftp.rfc-editor.org/in-notes/rfc1866.txt.

Developing CGI Application with Perl, J.Deep and P. Holfelder, 1996, pp. 61-80, 163-182, and 261-271.

Hypertext Transfer Protocol, Berner-Lee et al., May 1996, pp. 1-53, fttp://ftp.rfc-editor.org/in-notes/rfc1945.txt.

Designing a Generic Payment Service, Abad-Piero et al., IBM Research Division, Nov. 1996.

White Paper: Joint Electronic Payment Initiative(JEPI), Chung and Dardailler, 1997, www.w3.org/Ecommerce/white-paper.

Bluegill Cybercash: BlueGill Technologies and Cybercash Empower Billers with Complete Interactive Billing Solutions, Business Editors, Computers and Electronics Writers, Sep. 4, 1997.

System Posts Bills on the Internet, Interactive Week, v4, n32, p. 27, Sep. 22, 1997.

Net Delivery Receives Patent for Electronic Content Delivery Technology, Aug. 2, 1998.

Bill Presentment and Payment Hit the Web, TechWeb, Jeetu Patel et al., Nov. 16, 1998.

Internet Billing and Payment Systems for Energy Providers, The C Three Group, Apr. 1999.

Press Releases, CheckFree i-Solutions, 2000.

About CheckFree i-Solutions, CheckFree i-Solutions, 2000.

Emergis e-Invoicing, BCE Emergis, Feb. 2001.

Emergis e-Invoicing: Patent Information, 2001.

A Little History of the World Wide Web, www.w3.org/History.html.

Apache HTTP Server Project, http://httpd.apache.org/ABOUT_APACHE.html.

A Review of the HTML+ Document Format, D. Raggett, www.w3.org/MarkUp/HTMLPlus/htmlplus_paper/htmlplus.html.

Credit Card Transactions: Real World and Online, Keith Lamond, www.virtualschool.edu/mon/ElectronicProperty/klamond/Cyberpmt.htm.

CyberCash Credit Card Protocol Version 0.8, www.cis.ohio-state.edu/cgi-bin/rfc/rfc1898.html.

CyberCash, www.netstores.com/digistock/cybercash.html.

Direct Debits.

Electronic Data Interchange (EDI): An Introduction, Roger Clarke, www.anu.edu.au/people/RogerClarke/EC/EDUIntro.html.

Fill-Out Forms and Input fields, www.w3.org/MarkUp/HTMLPlus/htmlplus_41.html.

HTML Tags, www.w3.org/History/19921103-hypertext/hypertext/WWW/MarkUp/Tags.html.

Intermediaries and Cybermediaries: A Continuing Role for Mediating Players in the Electronice Marketplace, Sarkar et al., http://jcmc.huji.ac.il/vol1/issue3/sarkar.html.

Introduction to NCSA Mosaic for X 2.0, http://archive.ncsa.uiuc.edu/SDG/Software/Xmosaic/help-on-version-2.0.html.

NCSA Release Dates, http://archive.ncsa.uiuc.edu/SDG/Software/MacMosaic/Release-info/announce.html.

Network Payments Tutorial, http://ganges.cs.tcd.is/mepeirce/Project/tutorial.html.

Payment Mechanisms Designed for the Internet, http://ganges.cs.tcd.ie/mepeirce/Project/oninternet.html.
UN/EDIFACT message INVOIC, www.harbinger.net.
Upgrading NCSA HTTPd, http://hoohoo.ncsa.uiuc.edu/docs/Upgrade.html.
Netscape Navigator (Netscape Communications).
www.blooberry.com/indexdot/html/supportkey/f.htm.
www.rba.gov.au/VirtualGlossary/index.asp?State-direct+debit.
www.w3.org/Protocols/HTTP/AsImplemented.html.
www.w3.org/Protocols/HTTP/HTTP2.html.
NetBill 1994 Prototype, Goradia et al., 1994, pp. 1-91.
Self Service Document Processing for Banking Automation, Sharman and Zuckert, 1995, pp. 1-5.
ExpressNet from American Express Debuts on America Online, anonymous, Jan. 30, 1995.
iKP—A Family of Secure Electronic Payment Protocols, Bellare et al., (working draft) Mar. 15, 1995.
Controlling Telephone and Utility Costs with E-Bills, Wheatman, Aug. 16, 1995.
Telephone Companies Edging Toward Electronic Commerce, Anonymous, Sep. 4, 1995.
The Next Upheaval in the US Payment Systems, Bowers and Devine, Autumn 1995.
Electronic Money: Market Motivators, Wheatman, Oct. 4, 1995.
Issues in Electornic Bill Presentation, Wheatman, Oct. 27, 1995.
Visa Set to Launch Electronic System for Paying Bills, Anonymous, Dec. 4, 1995.
EDI: Banker's Ticket to Electronic Commerce?, Orr, May 1996.
Key Issues: Financial Products/Services/Delivery, Part 2, D. Renard, May 29, 1996.
Banking on the Future, L. Haber, Jul. 1996.
Privacy and Reliability in Internet Commerce, L. Camp, Aug. 1996, pp. 1-141.
CFI Steps Up to the Plate, F. Cerne, Sep. 1996.
The Payment System, Part 2: The Check is in the E-mail, I. Morrow, Nov. 6, 1996.
Net-Based Payment Schemes, R. Clarke, Dec. 1996.
Electronic Payment Systems, O'Mahony et al, 1997.
Successful Product Characteristics of Commerce: A Taxonomy of Transaction Types, C. Thachenkary et al., 1997, pp. 77-85.
A Test Moves Net-Based Bill Payment a Step Closer, L. Marable, Feb. 1997.
Princeton TeleCom Unveils Presentment Server, Anonymous, Feb. 15, 1997.
AmEx Opens ExpressNet to Internet, Anonymous, Apr. 30, 1997.
Advanced Information Management, Anonymous, Aug. 1997.
Designing a Generic Payment Service, Peiro et al., 1998, pp. 72-88.
Paperless Bills: You may soon be able to pay all your bills at a single Web site, S. Nash, PC Magazine, Jul. 1999, p. 28.
Design, Implementation, and Deployment of the iKP Secure Electronic Payment System, Bellare et al., IEEE Journal of Selected Areas in Communications, 2000, pp. 1-20.
Should you Bank Online?, Anonymous, Consumer Reports Magazine, Feb. 2002, pp. 28-31.
OEM Purchasing, anonymous.
Once upon a Time there was an Invoice, Anne Troye.
ExpressNet Bows, Clinton Wilder.

* cited by examiner

INTERACTIVE INVOICER INTERFACE

BACKGROUND OF THE INVENTION (1) Field of the Invention

The present invention relates generally to automated billing systems and, more particularly, to an automated electronic invoicing and payment consolidation system for providing remote customer review of billing information from at least two invoicers.

(2) Description of the Prior Art

Invoicing and payment collection has always been a very labor intensive and paper intensive process. Typically, the process has involved an invoicer, usually a business, who prepares an invoice detailing the goods and services provided and the charges therefor. The invoice is mailed to a customer who verifies the correctness of the invoice and returns a payment coupon of some type along with a paper check to the invoicer. The invoicer then submits the paper check to its bank for payment through; for example, the Automated Clearing House (ACH) network. Other similar payment systems include writing a credit card number, endorsing and preauthorization to draft an account on a monthly basis up to preset limits, such as regularly paying utility bills from a checking account.

With the advent of the Internet, invoicers have expressed the desire for the time-honored process of paper billing and payment to be automated. One approach that is somewhat popular is electronic bill payment services. In this approach, customers receive an invoice that is presented by paper and a separate payment service, often branded by a bank, allows payment to be pushed to the invoicer. The customer takes their paper bill and logs on to an Internet-based service that receives payment instructions resulting in either an electronic payment or, more often, a paper draft that is mailed on behalf of the customer.

This service, while in some ways convenient to the customer, can result in errors, as payment is often received with data irregularities that prevent accurate posting. Further, the customer must still handle the bills in much the same way as before and must actually give instructions to pay earlier, since 3-5 days may be required to perform the payment process. Checkfree is the largest provider of this type of service.

Most industry observers have noted that a more reliable and efficient processing for invoicing is for the customer to receive an electronic version of the invoice with an opportunity to make an electronic payment or dispute individual line items in the same session. To this end, a number of different approaches are known.

One approach is direct invoice presentment and payment as described in U.S. Pat. Nos. 6,044,362 and co-pending U.S. patent application Ser. No. 09/535,334. This invention established a direct link between customer and invoicer for the presentation and payment of electronic invoices. This technique is preferable to most invoicers in that it provides the strongest branding, flexibility, clarity in support operations, lowest cost and allows the invoicer to maintain current banking relations. However, one disadvantage of this approach is that the customer must access multiple accounts, each with different password and sign up requirements.

Another approach is consolidated bill presentment, whereby invoicers send their raw billing data to a central service that consolidates the data into a list of bills to display to customers of the companies participating with the service. Companies send their data to the consolidating service in a "Push Model." This is also referred to as "thick consolidation," as a large database is created, which combines data from many billers into a central service. Such electronic systems are described in U.S. Pat. Nos. 5,383,113, issued to Kight et al.; U.S. Pat. Nos. 5,649,117 and 5,956,700 issued to Landry; U.S. Pat. No. 5,283,829, issued to Anderson et al.; U.S. Pat. No. 5,220,501, issued to Lawlor et al.; and U.S. Pat. No. 5,465,206, issued to Hilt et al., the disclosures of which are hereby incorporated by reference in their entireties.

In these electronic billing and payment consolidation systems, the third party's website is the central point of access as customers login to access bills. Often, the third party consolidation service may allow, for a fee, a different organization to brand the page that the invoicers' customers might access. For example, Company A could send its raw billing data to a third party consolidation service and when the customers of Company A's access their invoices, the page would be branded by a bank or an Internet portal. While the invoice presented to the customer would still include Company A's logo, branding of the overall service, enrollment, banner ads, and the service relationship would be controlled by the third party consolidation service and its licensees.

This type of service offers some advantages to invoicers and customers alike. For invoicers, this approach is easy to adopt for a pilot as the service is outsourced and the invoicer need only provide raw billing files to start the process. Also, for the customers, enrollment and password management is simplified and bill review operations can be more efficient, as customers can access one website to see multiple invoices. Although these systems appear to streamline the process, they, in fact, may add a great deal of complexity and no small amount of expense to the process:

First, there are many consolidation services and customers will have distinct preferences in some cases. However, many invoicers feel they are compelled by the marketplace to work with multiple consolidation services to get their bills out to as many places as possible for added customer convenience. Since raw billing data and other reference information must be sent or pushed to different services, extensive operational investments must be made. Specifically, data formats are often different and the invoicer's internal support team must understand the nuances of each service. Also, different banking interfaces and payment posting routines can cause complexity in supporting multiple consolidators. Thus, the potential for cost savings of electronic presentment and payment can often be lost in the complexity.

Second, the service fees charged per invoice by consolidation service providers are often high and, once again, the potential for cost savings can be lost.

Third, branding is often no longer controlled by the invoicer, but is controlled by the third party consolidation service or by whomever purchases the right to re-brand from the third party consolidation service.

Fourth, the invoicer often looses control as to which parties are able to present the invoicer's invoices. In fact, a company that is deemed competitive by the invoicer might facilitate a bill consolidation service that includes bills of the invoicer by virtue of a business relationship with the third party consolidation service. As an example, a mortgage bill from a private financing company might be reviewed by a customer at a third party site re-branded by a competitor bank that also offers mortgage re-financing online through the bank. The banner ads presented on the bank's behalf might result in a loss of the private financing company's customer visiting that third party site.

Fifth, data sent to the third party is time sensitive. Subsequent changes of customer data at the invoicer are not reflected or updated in the electronic invoice presented. The electronic bill consolidation service can quickly become unsynchronized with data at the invoicer causing customer confusion that can lead to expensive user support.

Sixth, customer care is difficult in this environment since relationships may be confused for troubleshooting and support. Problems might result from reformatting or biller and there will be confusion as to the cause and remedy of the problem Seventh, there is no workable approach to "consolidate consolidators." That is, it is unlikely that a single third party consolidation service will acquire data from every invoicer of a specific individual service customer. The competitive nature of the market makes it almost certain that an individual will need to log on to more than a single, third party site to review all of their invoices since no single third party consolidator is likely to have enrolled all of a specific individual service customer's invoicers.

Still another technique for electronic bill presentment and payment is "thin consolidation." In this model, only summary data is sent or pushed to the central consolidation service. As customers login to see a list of bills and payment options, they can select a navigation option that links them to detailed information located at the invoicer during sessions managed and controlled by the central, third party service. While this approach provides more control to the invoicer over important customer operations, it also has significant drawbacks:

First, the central service largely limits the processing and usage options at the invoicer. For example, registration or enrollment in the service starts with the central service and invoicers do not always get full disclosure of what information was supplied at registration. Requiring enrollment at the consolidation service in many ways passes "ownership" of the customer to the third party consolidation service, rather than the invoicer.

Second, business relationships for payment are dictated by the central service in these models—not at the invoicer. Payment is required through the third party consolidation service.

Third, disputes regarding payment are accomplished at the third party consolidator, creating a difficult process of communication, customer care and reconciliation for the invoicer.

Fourth, invoicers lose branding opportunities and cannot control whom the third party consolidation service can allow to re-brand the service. The consolidated nature of the data in the service makes it difficult to provide an environment whereby its invoice summary could not be displayed by a re-branding portal that may advertise a competitor.

Fifth, thin consolidation, as currently practiced, does not allow the customer to login to see invoice detail directly at the biller, but must always start with the consolidation service.

An invoicing system should allow invoicers to maintain their direct relationship with customers, yet allows the convenience of simplifying access across multiple sites. Also, customers should be able to easily see a list of summary data from invoices and link to invoicers' sites without the biller giving up control over the process. There also needs to be a simple approach whereby an invoicer can "write once" for multiple publication by alternate access sites. Such a process would allow the invoicer to put summary data for inclusion in a list of bills, and then allow secondary presentment points to retrieve the data (Pull Model) from the invoicer's site for presentment. Invoicers should have means to make their summary data available for the consolidators to retrieve dynamically, rather than the current "push" consolidation technique, to ensure the most current data.

This requires consolidation techniques that preserve the branding of the biller, the customer care relationship, the choice of financial partners and the marketing opportunities of the invoicer. Such a system should not require that the provider of valuable content—in this case invoicers providing bill summary or fall, electronic billing data—to have to pay a third party to take the valuable content—only for that party to sell to additional parties down the line. The system should allow indexing across multiple direct sites that provides convenience to customers without removing important operations and control considerations from invoicers. Invoicers should also be able to select which sites could present bill and payment summaries, purchase orders, shipping documents, etc. Data should be provided in number of techniques to simplify retrieval and inclusion into other bill lists. The preferred embodiment includes provision of graphic images that are retrieved by the customer's browser as well as XML strings that are passed to secondary presentment partners.

Thus, there exists a need for a simple, straight forward system and method of automated electronic invoicing and payment that directly involves the invoicer and the customer while, at the same time, would allow customers to visit a invoicer's website through a single portal or bank site and review a summary of all of their bills and then visit invoicers' Web sites. Such a system would permit presentation of truly current data to the customer while, at the same time, provide timely payment to the invoicer. Also, since there is no need for a third party payment engine, the invoicer gains both lower cost per transaction and can control "branding" at the URL or portal rather than having to show the banner ads of a third party provider.

SUMMARY OF THE INVENTION

The present invention is directed to an automated electronic invoicing and payment consolidation system for providing remote customer review of billing information from at least two invoicers. In the preferred embodiment, the system includes three primary components: a consolidated invoicer interface; a remote customer interface for accessing the consolidated invoicer interface; and a payment engine.

In the preferred embodiment, the consolidated invoicer interface provides at least one access point to each of the invoicers; sets the access point of each of the invoicers for at least one customer; authenticates each of the customers; and automatically requests account information directly from each of the invoicers.

Also, in the preferred embodiment, the payment engine sends the customer payment instructions from the customer directly to each of the invoicers. The preferred payment engine is set forth in commonly owned U.S. Pat. No. 6,044,362, issued Mar. 28, 2000 and co-pending U.S. patent application Ser. No. 09/535,334, which are hereby incorporated by reference in their entirety.

The payment engine includes: invoice presentation electronics adapted to present customer billing data for customer review and to request payment instructions relating to automated billing to the customer; and a remote electronic customer authorization interface adapted to: (i) receive the customer billing data for customer review and the request for payment instructions from the invoice presentation electronics; (ii) provide the customer billing data and the request for payment instructions to the customer; (iii) receive customer payment instructions from the customer in response to the request for payment instructions; and (iv) transmit the customer payment instructions from the customer directly to each of the invoicers, the payment instructions including at least an invoice account number and an associated customer payment account.

Thus, in the preferred embodiment, customer data is pulled from invoicer's sites through a component installed on each invoicer's web sites. This component reads invoicer's data, packages it and fulfills requests made to the portal by the customer.

Accordingly, one aspect of the present invention is to provide an automated electronic invoicing and payment consolidation system for providing remote customer review of customer account information from at least two invoicers. The system includes: a consolidated invoicer interface wherein the invoicer interface includes: (i) at least one access point to each of the invoicers; (ii) means for setting the access point of each of the invoicers for at least one customer; and (iii) means for authentication of each of the customers; and a remote customer interface for accessing the consolidated invoicer interface.

Another aspect of the present invention is to provide a consolidated invoicer interface for an automated electronic invoicing and payment system for providing remote customer review of customer account information from at least two invoicers. The system includes: at least one access point to each of the invoicers; means for setting the access point of each of the invoicers for at least one customer; means for authentication of each of the customers; and means for automatically requesting account information for said customers directly from each of the invoicers.

Still another aspect of the present invention is to provide an automated electronic invoicing and payment consolidation system for providing remote customer review of customer information from at least two invoicers. The system includes: a consolidated invoicer interface wherein the invoicer interface includes: (i) at least one access point to each of the invoicers; (ii) means for setting the access point of each of the invoicers for at least one customer; (iii) means for authentication of each of the customers; and (iv) means for automatically requesting account information for said customers directly from each of the invoicers; a remote customer interface for accessing the consolidated invoicer interface; and a payment engine wherein the customer payment instructions are sent from the customer directly to each of the invoicers, the payment engine including: invoice presentation electronics adapted to present customer billing data for customer review and to request payment instructions relating to automated billing to the customer; and a remote electronic customer authorization interface adapted to: (i) receive the customer billing data for customer review and the request for payment instructions from the invoice presentation electronics; (ii) provide the customer billing data and the request for payment instructions to the customer; (iii) receive customer payment instructions from the customer in response to the request for payment instructions; and (iv) transmit the customer payment instructions from the customer directly to each of the invoicers, the payment instructions including at least an invoice account number and an associated customer payment account.

These and other aspects of the present invention will become apparent to those skilled in the art after a reading of the following description of the preferred embodiment when considered with the drawings.

BRIEF DESCRIPTION OF THE DRAWINGS

FIG. 110 is a schematic representation of the dynamic display portion of an automated electronic invoicing and payment consolidation system constructed according to present invention;

DETAILED DESCRIPTION OF THE PREFERRED EMBODIMENTS

Figure 101:
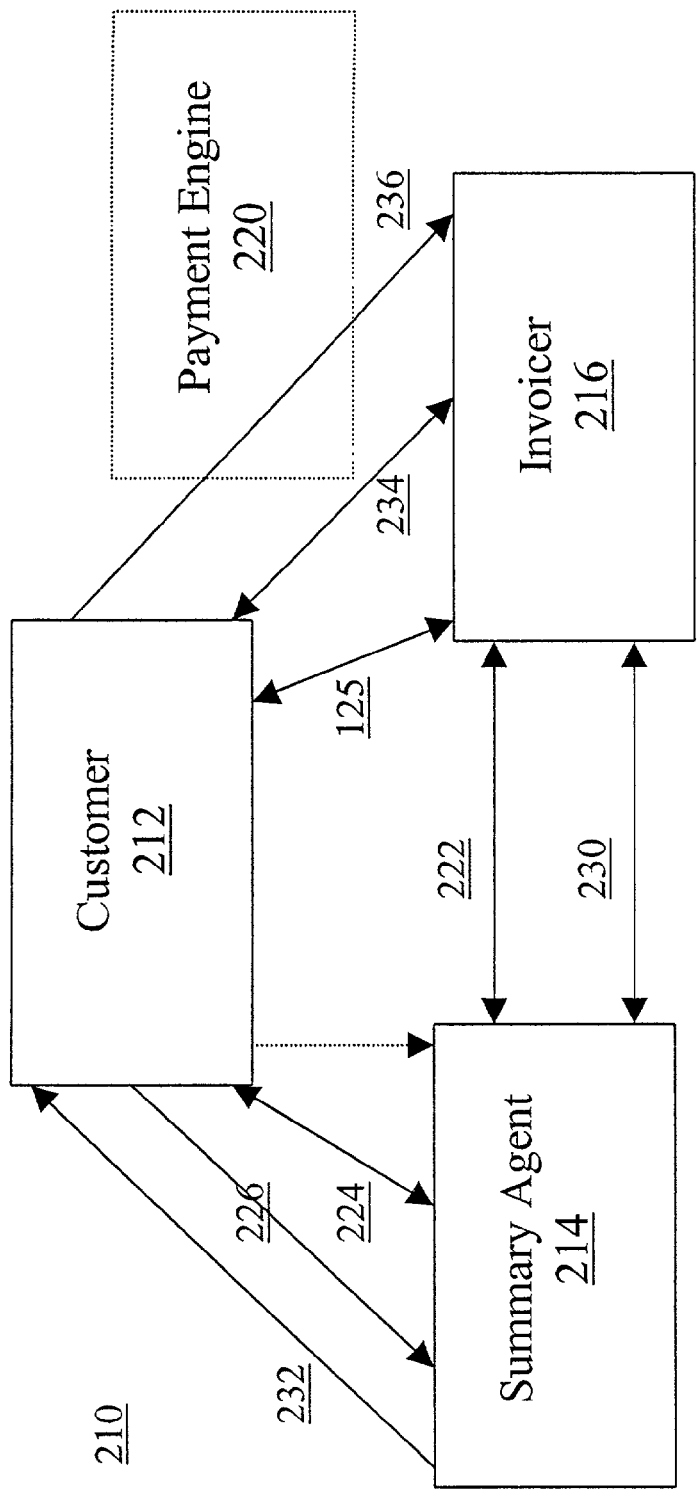
FIG. 101 is a schematic overall representation of a method for providing electronic invoice summaries and paying performed according to present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

As best seen in FIG. 101, there is shown an overall schematic view of a dynamic consolidation model, generally designated 210, constructed according to the present invention. The basic components are the customer Internet interface 212; the summary agent portal 214; and at least two invoicers 216. In the preferred embodiment, the invention also includes a payment engine 220, which is the interface between the customer Internet interface 212 and the invoicers 216. In the preferred embodiment, such a payment engine is described in U.S. Pat. No. 6,044,362, issued Mar. 28, 2000, which again is hereby incorporated by reference in its entirety.

Looking first at the overall dynamic consolidation model 210, each of the invoicers 216 and the summary agent 214 first setup an initial agreement 222. The agreement would include at a minimum, URLs for access, summary agent name, and other elements to be used for validation. Additionally, an invoicer and a portal may also agree upon a web page to be used for customer enrollment. On this enrollment page, the invoicer would specify elements required for validation of the customer, e.g. username, password, account and pin number. These elements would in turn be used by the summary agent and invoicer when retrieving data or in validating a transfer to the invoicer site. After the summary agent and biller enrollment is complete, customer 212 may first enroll at the summary agent portal 214, then be transferred for enrollment at the invoicer's site 216.

In an alternative embodiment, the customer could enroll with the invoicer first and enter relevant customer information. After enrollment is complete at the invoicer, the customer could then specify that it would like to have its bills displayed at a number of portals. Thus, while the preferred embodiment for customer enrollment is to start with the portal and pass enrollment to the invoicer, enrollment may also begin at the invoicer and the invoicer may provide a list of portals that the invoicer has agreements with from which the customer could then select those portals where the customer would like to have its bills displayed.

While customer enrollment is shown in FIG. 101 as being two separate actions 224, 225, the summary agent portal 214 could be authorized to complete the enrollment setup between the customer 212 and invoicer 216 as the customer's agent. Authentication information may also be generated and stored at the portal and then also subsequently stored at the invoicer. When the customer begins to request summary information, the summary agent upon the request first validates the customer. Then the request is sent to the invoicer and the invoicer verifies the customer requests is actually for an account that they currently have and there is a valid account password pair that they can then return back to the portal.

Also, during the enrollment between the summary agent and invoicer, the invoicer could also specify relevant URLs for the customer to view detailed invoice information. Thus, when the customer chooses to view detailed information at the summary agent, they could be passed to a site that has been provided by the invoicer, the customer would then be taken to that particular invoicer site based upon the URL that the invoicer has specified.

In operation, customer 212 sends a request 226 to summary agent portal 214 to show all outstanding bills. In response, summary agent portal 214 sends a request to each invoicer site 216 to deliver bill summary information to summary agent portal 214 for the selected customer 212 along line 230. Summary agent portal 214 then delivers the consolidated bill summaries to customer 212 via line 232. When, as in the preferred embodiment, a payment engine 220 is in place, the customer 212 may view detailed invoicer information along line 234 and, in addition, may also modify payment arrangements along line 236 as discussed in detail in commonly owned U.S. Pat. No. 6,044,362. At this point, the customer can actually authorize payment and the invoicer will send and request to receive funds directly from the customer's bank, without the need for a third party consolidator.

Figure 102:
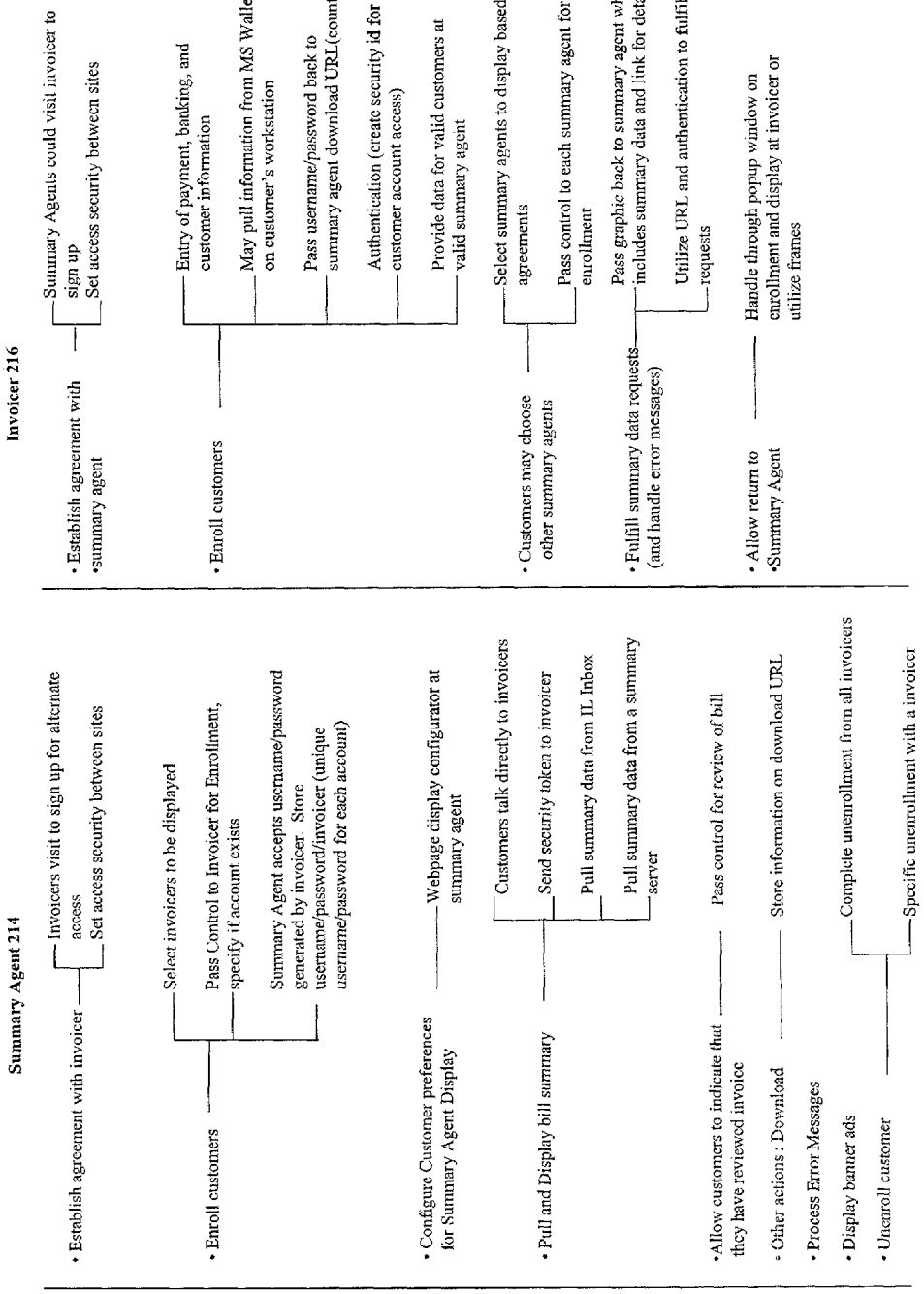
FIG. 102 is a functional representation of the "thin portal" model for electronic invoicing and paying performed according to present invention.

The actual operation of the present invention may also be understood functionally by referring to FIG. 102. As can be seen, summary agent portal 214 establishes initial agreement with the invoicer, which includes both allowing the invoicer to visit the portal site and sign up the invoicer site to provide ultimate access for the customer. Invoicers at this time can also setup the access security between the sites and what information will be available to the customer at the summary agent portal 214.

In addition, summary agent portal 214 allows the customers 212 to enroll and select the invoicers to be displayed and passes control to the invoicer for enrollment of a particular customer. The portal accepts a unique username and password generated by the invoicer, stores each of these unique username and passwords for each customer account. In the preferred embodiment, these pairs are saved at the summary agent portal for each customer 212 and do not have to be reentered each time a customer 212 logs in to the summary agent portal 214. The summary agent portal 214 also allows the customer to configure his preferences for the portal display at the summary agent portal Web page.

Where the customer is allowed to configure his preferences for the portal display, this would be a "portal configurator" where the customer is actually able to specify user interface display changes based upon certain events. One example may be if the bill is late or past due, change the colors by which the bills being shown at the portal site, which gives the customer some indication of a late payment or a late bill that is about to occur, or the customer may want to specify a particular amount that the customer wants to have highlighted if a bill exceeds a certain amount within the summary, things along those nature, would be determined as preferences by the customer.

The summary agent portal 214 pulls and displays the bill summary information from the invoicer site 216. The portal sends the customer request directly to the invoicer site and sends the request by first transmitting authentication information, for example an encrypted name/password pair or a security token, to the invoicer's site and then receiving summary data from the invoicer or from a summary server at the invoicer's site. At this time, using a payment engine, such as described in commonly owned U.S. Pat. No. 6,044,362, the customer 212 can also go directly to invoicer 216 and execute a payment transaction.

In addition to the above functions, summary agent portal 214 may allow the customer to indicate that they have reviewed the invoice or download the payment summary data information on the screen. In addition, the summary agent portal may process and display transmission error messages which the customer may then attempt to correct. The summary agent portal 214 also may be used to display banner ads to generate additional revenue for the summary agent portal owner. Finally, the summary agent portal may also allow the customer to unenroll from one or more invoicers in the event the customer no longer wishes to use the summary agent portal, or no longer has an account with a specified previously enrolled invoicer.

The invoicer's site 216 has complimentary functions to the summary agent portal 214. The invoicer site 216 operates to establish an agreement with summary agent portal 214 including allowing a portal administrator to directly visit a invoicer's site to signup a portal and to set the access security of the portal site. The invoicers' site 216 also enrolls individual customers and provides for the entry of payment banking and customer information. This process can be performed manually by the customer or by pulling information from Microsoft Wallet or similar programs that exchange this information with the customer's workstation. In addition, the invoicer's site will pass the customer's authentication information, for example the username/password pair, back to the summary agent. This authentication creates a security ID for customer account access to provide data for valid customers.

In addition to a single portal model, the invoicer site may also allow a customer to choose multiple portal entries. For example, a customer may wish to have the option of going through multiple portals, such as AOL or YAHOO!.

The invoicer site 216 fulfills the data summary request and handles error messages from summary agent portal 214. It passes graphics or XML to the portal, which includes summary data, and, at the same time, the invoicer's link for detailed data review. This utilizes the URL established during the enrollment process to fulfill these requests. Finally, the invoicer site 216 allows return to the summary agent portal 214 through, for example, through a popup window to display at the invoicer's site 216 or by utilizing frames.

In the preferred embodiment, the "thin" portal model does not store any of the customer's information at the portal, neither payment information nor detailed invoice information. The customer is always sent to the invoicer to view detailed invoice information or execute payments. First, the invoicer enrolls with a portal banking server or with a presentation service. The invoicer first shows authentication parameters for communications with the presentations service and the invoicer. At the same time, the invoicer establishes URLs and summary server IDs to allow contact between the summary agent portal 214 and the invoicer site 216. The invoicer can also, at the same time determine its frequencies of updates to portal based on its billing cycle. Finally, the invoicer may also allow for banner ad management information at the portal with respect to the invoicer.

Figure 104:
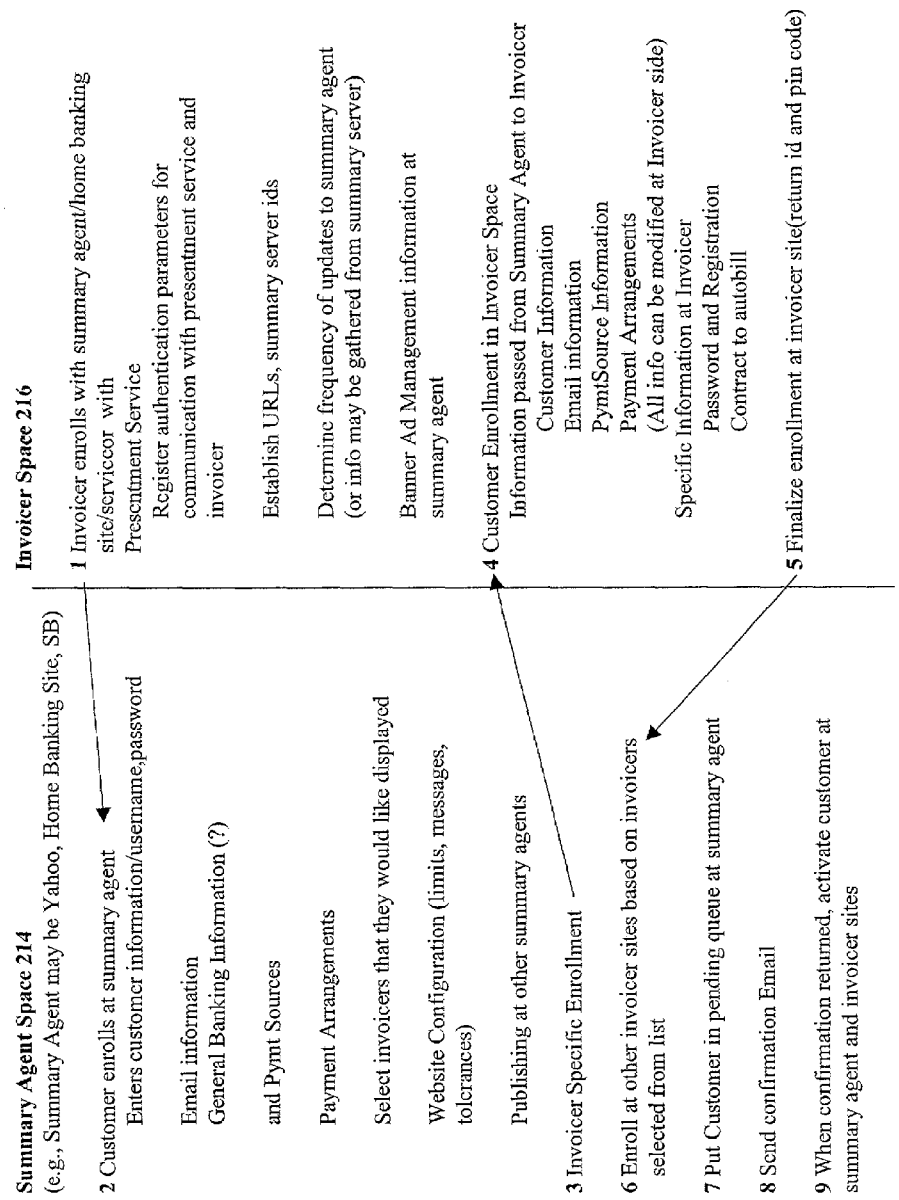
FIG. 104 is a detailed functional representation of the enrollment process at a portal for electronic invoicing and paying performed according to present invention.

As best seen in FIG. 104, the enrollment process is described in more detail. In the enrollment process, the summary agent portal 214, such as YAHOO!, AOL, or Home Banking Site allows the customer to enroll at the portal by entering customer information and a username password pair. In addition, the customer may add e-mail information to allow the portal site to notify customer 212 of the receipt of a new bill summary. The customer also may enter general banking information, payment sources including payment arrangements and invoicers the customer would like displayed. At the same time the customer can configure the information displayed by the invoicer, for example such as the page display, including limits, messages, and tolerances. Finally, the customer can allow publishing at other portals at the same time.

Once the customer has been enrolled, the customer may also, at the same time, enter invoicer specific enrollment information either at the summary agent's or at the invoicer site 216. In the case of customer enrollment in the invoicer site 216, this information may be passed from the portal to the invoicer including customer information, e-mail information, payment source information, and payment arrangements. This information may be modified at the invoicer's site 216 if it changes in the future. Once the finalized enrollment is made at the invoicer's site, it returns customer information, such as an ID and pin code, to the portal agent summary 214. The customer 212 may also enroll at other invoicer sites based on invoicers selected from the list by the customer 212.

The summary agent portal 214 puts the customer in the pending queue at the portal and sends confirmation to the customer via e-mail. When the confirmation is returned that the customer has received and opened the e-mail, it will activate the customer at the portal and the invoicer sites to allow the customer to review its summary bills.

The payment information that the portal collects may then in turn be published to the other invoicer sites. As used herein, published to the invoicer site means that the information is sent to the invoicers so that the invoicers now have the payment information.

Figure 105:
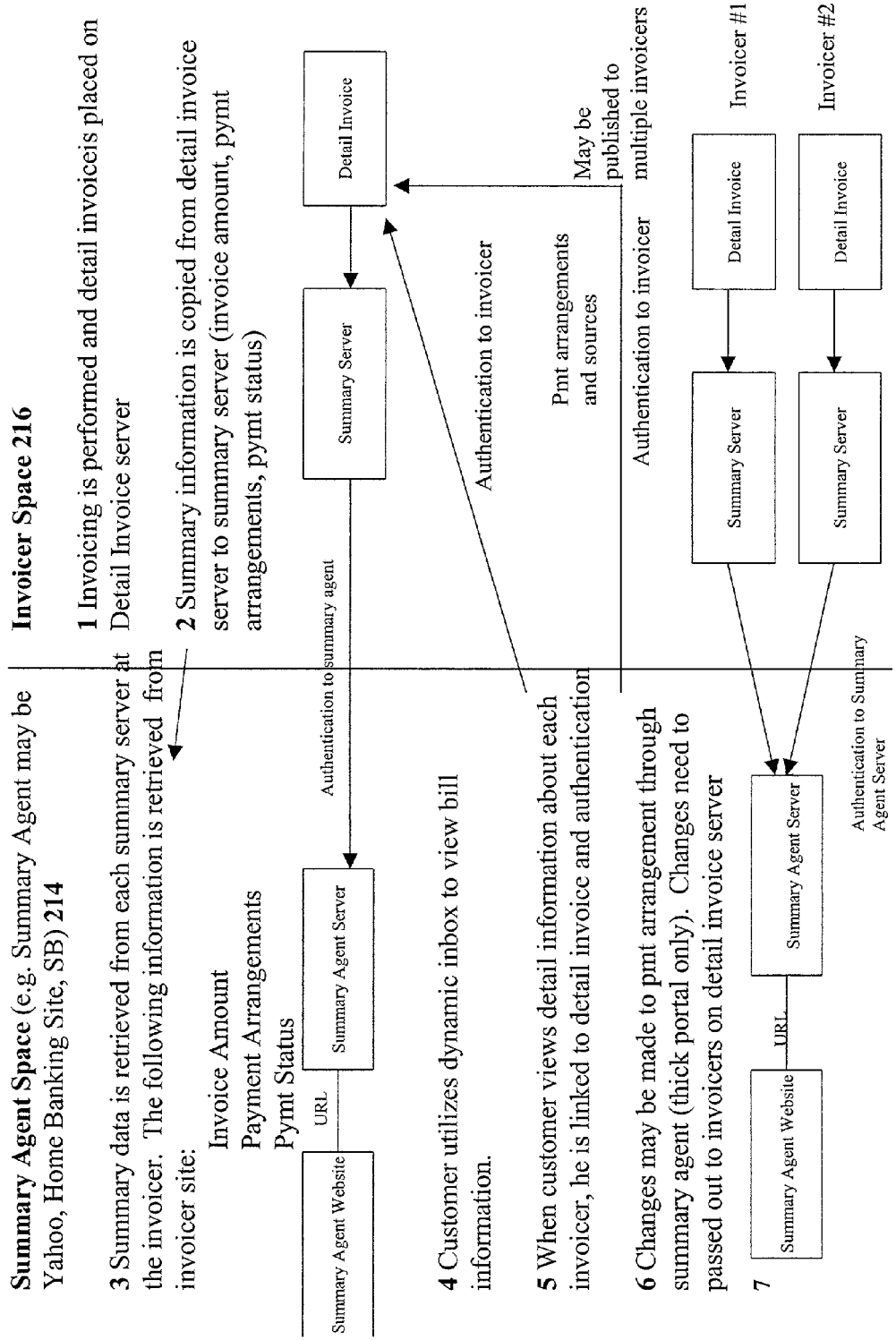
FIG. 105 is a detailed functional representation of the invoicing/presentation process at a portal for electronic invoicing and paying performed according to present invention.

The invoice presentation process of the present invention can best be understood by referring to FIG. 105. First, at the invoicer site 216, invoicing is performed and detailed invoices are placed on the detailed invoice server. Summary information is copied from the detailed invoice server to a summary server, which includes, for example, invoice amounts, payment arrangements, and payment status. Summary data is then retrieved from each summary server at the invoicer including the invoice amount, payment arrangements and payment status. Customer 212 utilizes the DYNAMIC INBOX to view the bill information at the summary agent.

When the customer is ready to review detailed information about each invoice, he is linked to the detail invoice and authentication is sent upon the transfer to the invoicer site 216. In the case of the "thin" portal model, these detailed records are not kept at the summary agent portal. In contrast using the "thick" portal model, changes may be made to the payment arrangements through the summary agent portal to the invoicer site 216 and passed out to the invoicer on the detailed invoice server.

Figure 106:
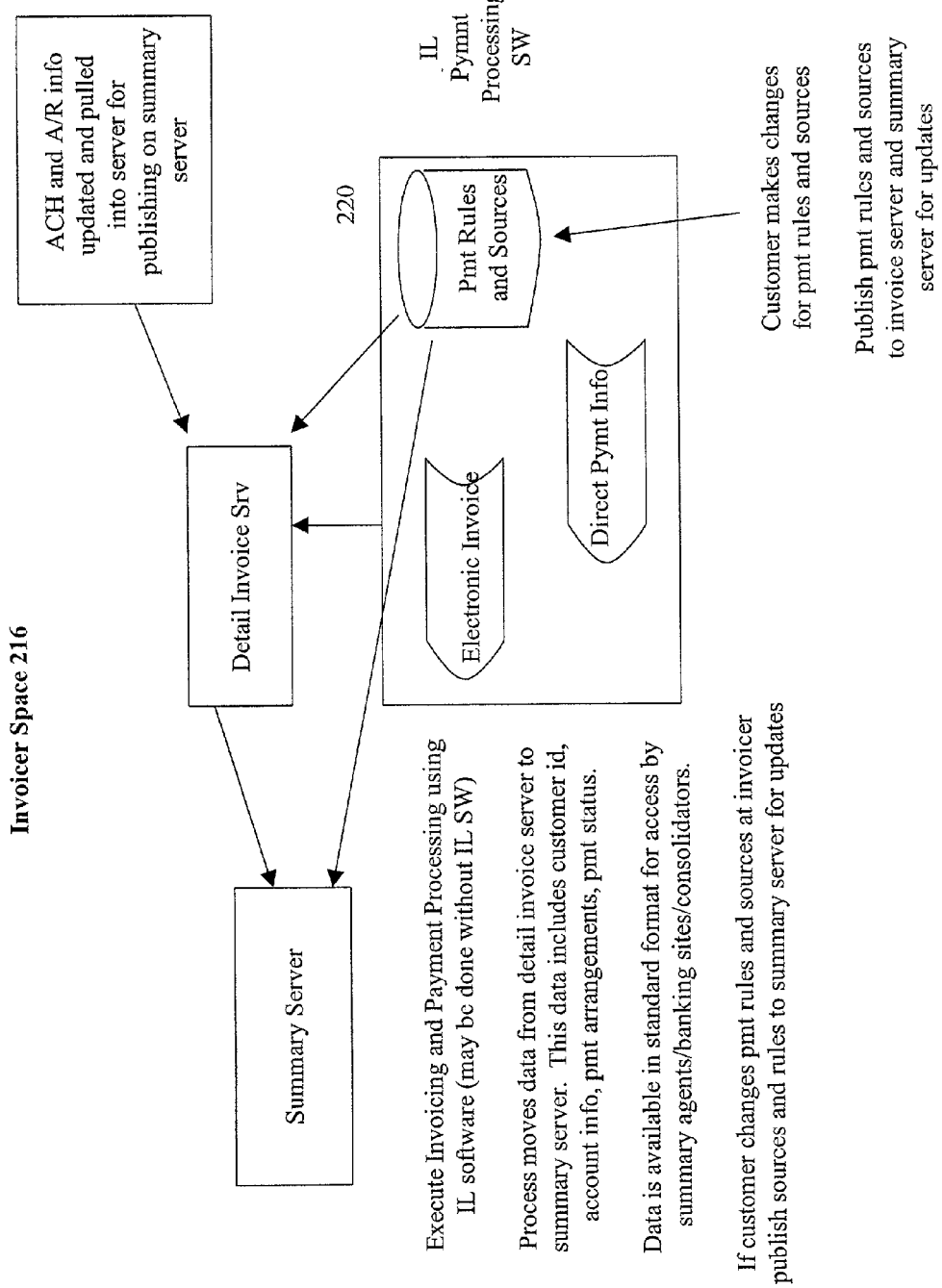
FIG. 106 is a detailed functional representation of the summary server/payment process of the method for electronic invoicing and paying performed according to present invention.

As best seen in FIG. 106, once transferred to the invoicer's site 216, the customer 212 may access through a payment processing engine 220 paying and updating its accounts, which will be described in more detail in FIGS. 112; 113A and 113B, (what are these numbers) below.

Figure 107:
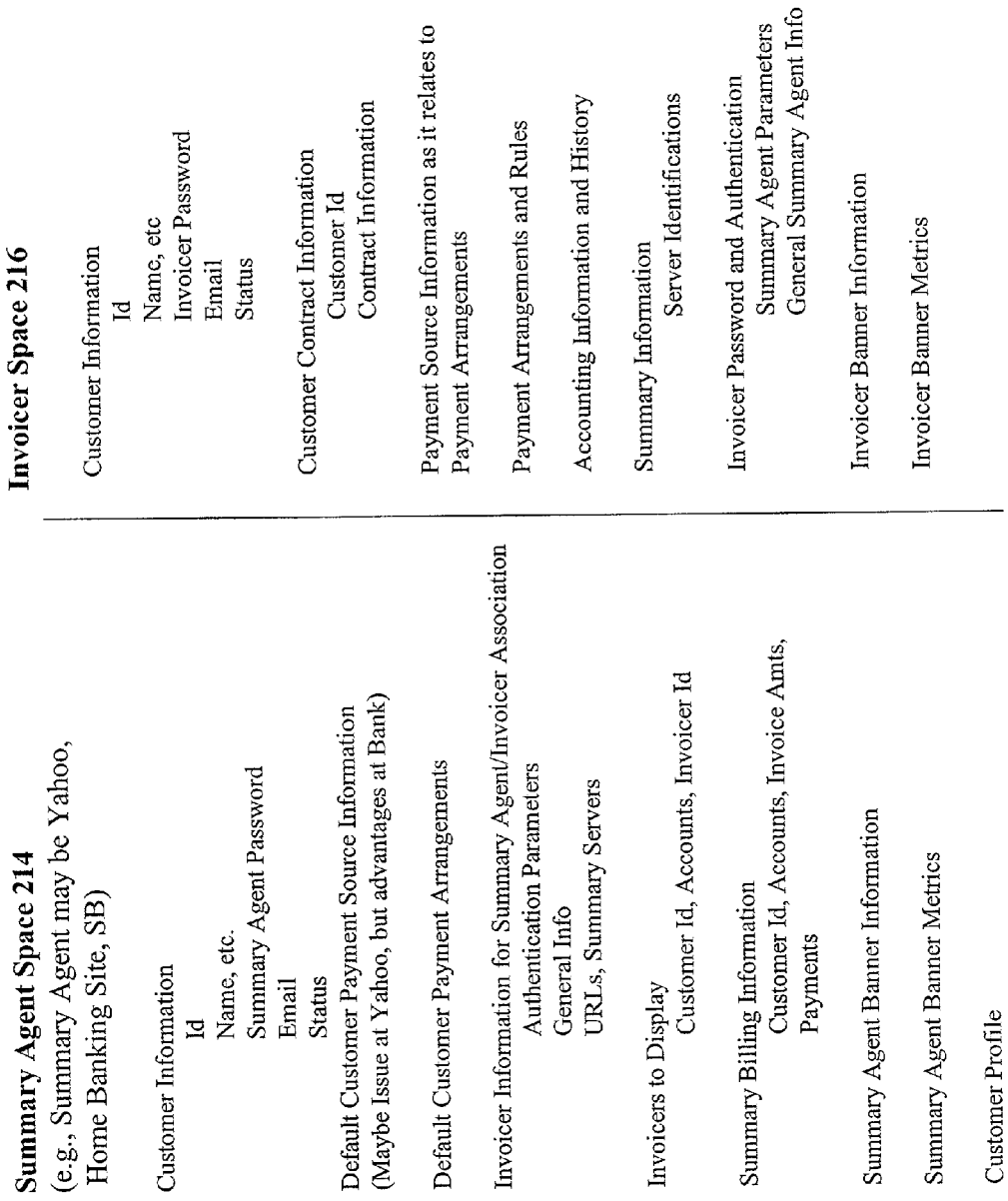
FIG. 107 is an example of a suitable data model of the "thin portal" electronic invoicing and payment system constructed according to the present invention.

Turning to FIG. 107, there is shown an outline of the preferred data model for the present invention. In the preferred embodiment, the summary agent portal 214 includes detailed customer information and default customer payment source information. It also includes a default customer payment arrangements and invoicer information for the portal/invoicer association. This may include the invoicers' display and the billing summary information. Portal banner information and portal banner metrics and customer profile may also be stored at the summary portal agent 214.

At the invoicer site 216, complimentary customer information and the name/password pair for the customer. The invoicer site 216 further includes customer contact information and payment source information, payment arrangements and rules, and accounting information and history. In addition, it includes summary information such as the server identifiers and invoicer password and authentication for portal parameters and general portal information. Finally, the invoicer site 216 may include invoicer banner information and invoicer banner metrics.

Figure 108:
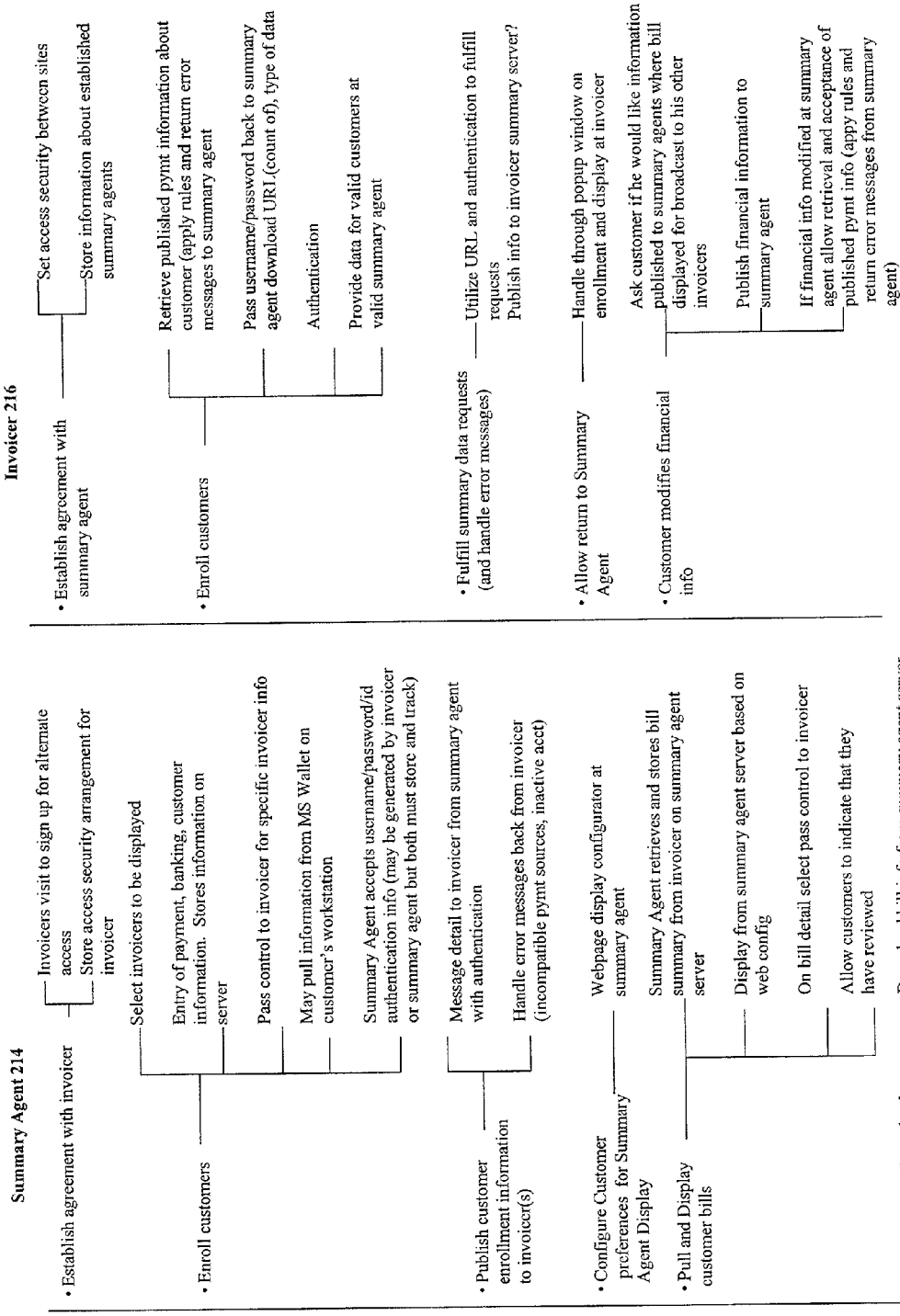
FIG. 108 is a functional representation of a "thick portal" electronic invoicing and payment system constructed according to the present invention.

An alternative embodiment of the present invention is the thick portal model. The distinction between thick and thin portal models is that in the thick portal model, payment information is contained at the portal site and then is published in turn to the invoicers. The dynamic consolidation functional model for a thick portal model is best shown in FIG. 108. This embodiment differs from the embodiment model shown and discussed with respect to FIG. 102 and the following critical parameters, payment information is stored at the portal and detailed invoice information may also be stored at the portal.

Figure 109:
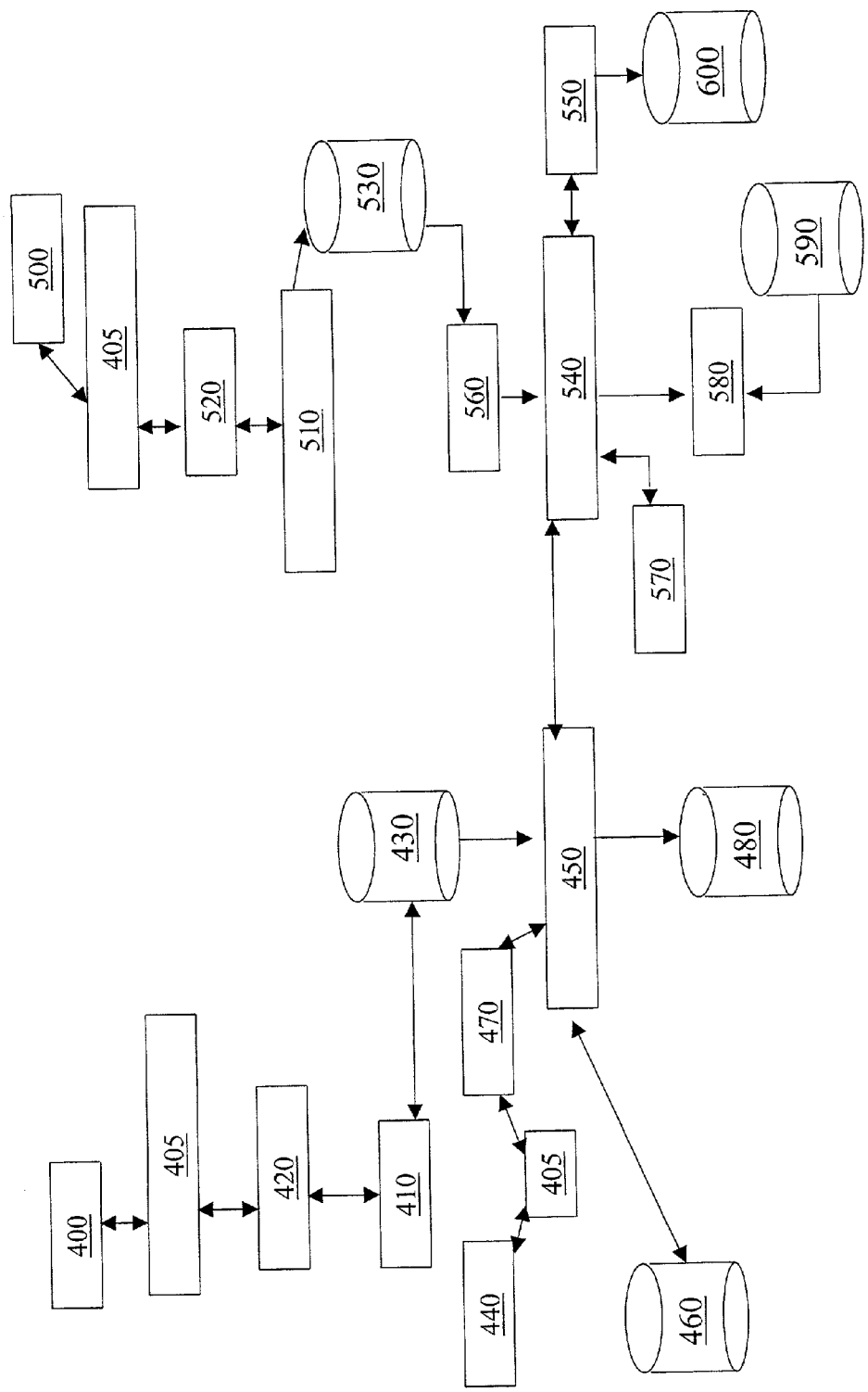
FIG. 109 is a schematic representation of the enrollment portion of an automated electronic invoicing and payment consolidation system constructed according to present invention.
Figure 11C:
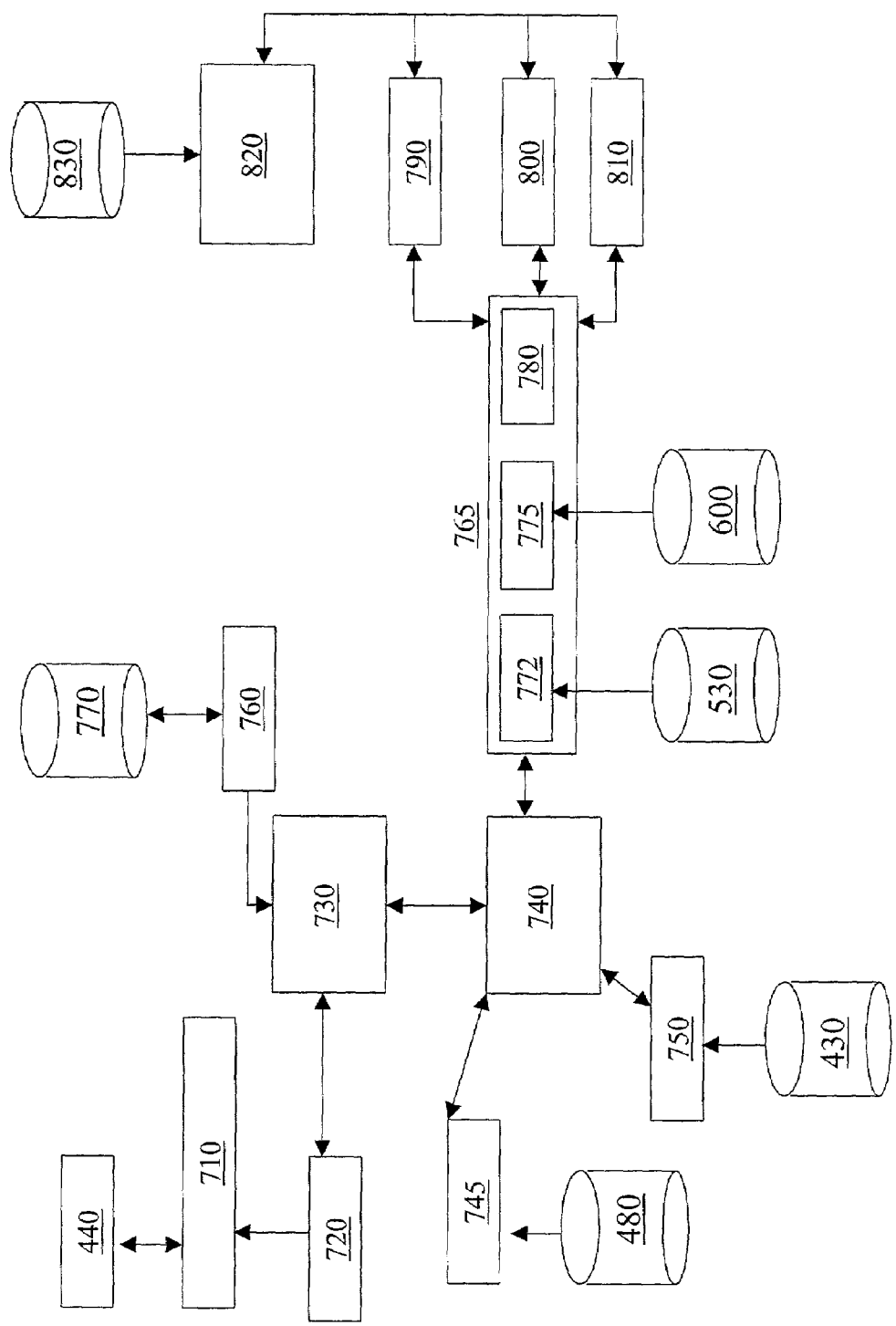

As best seen in FIG. 109, there is shown a schematic representation of the enrollment portion of an automated electronic invoicing and payment consolidation system constructed according to present invention. Remote computer 400 accesses the portal administration web server for enrolling invoicers. Network 405 accesses web server, through either Internet, internal LAN, dialup. Invoicer enrollment application 410 that allows customer to enter in information about individual invoicers Page display 410 allows customer to enter information about invoicer, including URLs, graphics, validation fields, and logos. Application then stores information into database 430.

Web server 420 at the portal hosts enrollment application. Database 430 stores invoicer enrollment information. The database is also used to retrieve information about the list of valid invoicers, which the customer can select from when enrolling in this service. Remote computer 440 accesses the portal administration web server for enrolling customers.

The Customer enrollment application 450 allows the customer to select which invoicers they would like to have displayed in their dynamic inbox. The application 450 first reads from the database 430 to determine list of valid invoicers that can be displayed to the customer and retrieves invoicer information to complete enrollment (e.g. URL to pass customer for completion of enrollment at the invoicer). The application 450 then displays a list of these valid invoicers to the customer. When the customer selects the invoicer, the application 450 displays a list of fields that the customer must complete (e.g. username, password, account). These fields are invoicer specific and are also retrieved from the database 430. Once these fields are completed, the customer is passed to the invoicer enrollment application 540. The invoicer validation information is also passed in this transfer. The invoicer enrollment application is responsible for generating authentication information for access within the dynamic inbox. This authentication information is passed back to customer enrollment application 450 and then stored in the customer and authentication information database 480.

Customer desktop payment information is shown in 460. The customer may have entered payment account information (e.g. checking account information, credit card information) and stored in a local database on their personal machine. Customer may have entered information through an application like Microsoft Wallet. This information can then be passed to the invoicer enrollment application 540 through XML, OFX/IFX or other data publishing standard.

Web server 470 at the portal hosts the customer enrollment application. Database 480 stores the customer enrollment and authentication information.

Remote computer 500 accesses the invoicer administration web server for enrolling portals. The portal enrollment application 510 allows customer to enter in information about individual portals. The page display allows customer to enter information about portal, including identification and URLs. Application 510 then stores information into database 530. Web server 520 at the invoicer hosts the portal enrollment application. Database 530 stores portal enrollment information. The database is also used by the portal validation application 580 to verify that the portal passing control during customer enrollment is a portal that has been enrolled with invoicer.

The invoicer enrollment application 540 accepts the request from the portal customer enrollment page 450 and calls the portal authentication application 560 to verify portal that the request originates from. Application 540 also generates authentication information for the customer and returns this authentication back to the portal customer enrollment application 450. Application 540 also stores this authentication information into a database 600 for future authentication on dynamic inbox. Application 540 also verifies that this customer is an EBPP customer at this invoicer by providing the customer authentication application 580 the fields and values entered at the portal.

Authentication Data Generator 550 creates security information, encrypts this security information and stores this data into the Dynamic Consolidation Authentication database 600. It is called from the invoicer enrollment application 540 and passes back the generated authentication information.

Portal Authentication application 560 reads from the portal enrollment database 530 to determine the list of valid portals and their appropriate identifications. The application 560 is called from the invoicer enrollment application 540 that passes it the portal identification received on the request. This application takes this portal identification, checks it against this database, and validates its existence and proper identification.

Web server 570 at the invoicer hosts invoicer enrollment application. Customer Authentication application 580 reads from the invoicer's EBPP database 590 for the list of valid customers and accounts. It checks to make sure that this is a customer on EBPP and that the account is valid for this customer and that the customer has entered proper validation for accessing this account.

The EBPP database 590 manages customers on this service, list of accounts, and validation information for customer to access specific accounts.

Customer Authentication database 600 is used to store the security and validation data for customer that was generated by the authentication data generator 550. It is used for validation when customer wants to display bills from the dynamic inbox.

As can be understood, Enrollment could be done beginning at the invoicer site and the invoicer will display list of possible portals for customer enrollment. Control would then be passed to the portal to complete the enrollment process. In addition, desktop payment information 460 could be passed to the invoicers using a variety of standards, XML, OFX/IFX. The way in which this information is passed to the invoicers should not limit this patent.

As best seen in FIG. 110, there is shown a schematic representation of the dynamic display portion of an automated electronic invoicing and payment consolidation system constructed according to present invention. Remote computer 440 accesses the portal display web server for enrolling invoicers. Network 710 accesses web server, through either Internet, internal LAN, or dialup. Web server 720 at the portal hosts the dynamic inbox application.

The portal Page builder application 730 creates page for display of portal information to customer. This application constructs and outputs web html documents for display on the web server. It also accepts customer requests for display and navigation through the page and site. This application calls the bill summary page builder 740 to create the dynamic inbox section of the page for the customer. The portal application 730 passes the customer information obtained by the customer login into the portal site to the bill summary page builder 740.

Bill summary page builder application 740 constructs the bill summary for the customer on the portal's page. The page builder builds the dynamic inbox for a customer upon request by first authenticating through the customer authentication application 745 that validates that this is a valid customer. It also retrieves the stored security tokens for the customer to pass to the invoicer data server 765 in encrypted form through a secure link. The invoicer data server 765 then confirms the customer's validation information against its customer authentication database 600. The bill summary page builder also retrieves from the customer authentication application 745 the list of invoicers that the customer chooses to display in their dynamic inbox. The bill summary page builder then calls the invoicer authentication application 750 to validate the invoicers selected by the customer and also retrieves the invoicer URL information for building the invoicer links in the dynamic inbox.

The bill summary page builder passes a series of requests to the invoicer data server 765 through a secure link for the customer, including security tokens for validation, invoicer, and accounts, and type of data requested. After validating the customer and the invoicer, the invoicer data server 765 then returns back the requested data to the bill summary page builder through a secure link.

Invoicer authentication application 750 validates that the invoicers sent from the bill summary page builder are valid invoicers by checking against the invoicer authentication database 430. It also retrieves other invoicer information including URLs from the invoicer authentication database 430.

Customer preferences application 760 allows customer to configure the display of web pages from the portal. The customer is able to select how and what items they would like to have displayed on their page. The customer can also configure how bills are displayed for dynamic inbox in this application by selecting display changes based upon certain values. For example, the customer could configure the application to change the color of the invoicer line to red if the date due has exceeded the current day. This application will store customer's preferences and retrieve them upon page display by the customer.

Database 770 stores customer page preferences. This database is used for storage of those preferences and its data is retrieved by the customer preferences application 760 for determining the customer's preferences when displaying the page.

Invoicer data server 765 is responsible for validating the request from the bill summary page builder 740 and returning the appropriate data or error message to this application.

The portal validation application 772 is part of the invoicer data server 765 that first validates that portal making the request is a valid portal by checking against the portal enrollment database 530. Account validation application 775 is part of the invoicer data server 765 that validates the customer's account and identification is valid by checking the security tokens against the customer authentication database 600. The application decrypts the security token and compares this decrypted token with the customer's token stored in the database.

The Request Translator application 780 is part of the invoicer data server 765 and passes the customer's request to the appropriate server for retrieving the necessary data. XML server 790 retrieves information about the customer's bill data for this account and packages it into an XML format that is returned to the invoicer data server 765. It retrieves this information through the invoicer summary server application 820 that retrieves this information from the invoicer's system either at the time of the request or in a batch mode.

Graphics Server 800 retrieves information about the customer's bill data for this account and packages it into a graphic format (GIF, or other graphic format) and returns it to the invoicer data server 765. It retrieves this information through the invoicer summary server application 820 that retrieves this information from the invoicer's system either at the time of the request or in a batch mode.

Generic or specific format server 810 retrieves information about the customer's bill data for this account and packages it into in specified format. This format can be IFX, OFX, EDI, or other specified format and these servers will handle the packaging of this information to be passed back to the invoicer data server 765. It retrieves this information through the invoicer summary server application 820 that retrieves this information from the invoicer's system either at the time of the request or in a batch mode.

Invoicer summary server application 820 receives request from the format servers and retrieves this invoicer information from the invoicer summary database 830. The invoicer summary database is populated by the invoicer either at the time of the request or through batch processing. Alternatively, the invoicer summary server could retrieve the information directly from the invoicer systems through some interface or specified database stored procedure.

Database 830 stores invoicer summary information that the invoicer's system either populates at the time of the request from the invoicer summary server application or is updated on a periodic basis from the invoicer systems.

Figure 111:
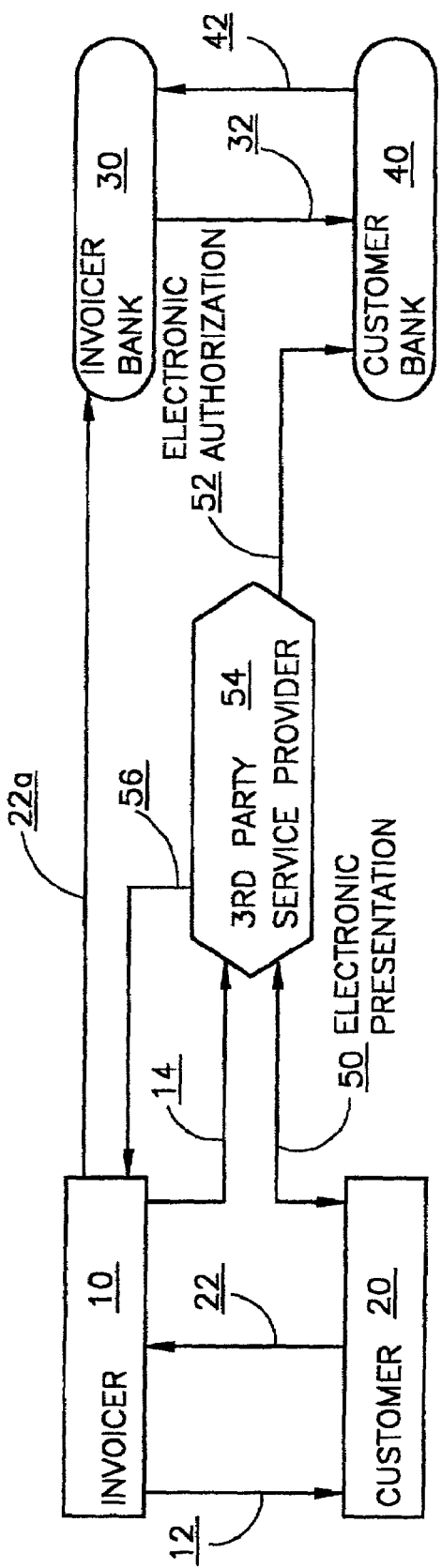
FIG. 111 is a schematic representation of a prior art invoicing payment engine system.

Turning to FIG. 111, there is illustrated the current process used for paper invoice payment and automated invoice payment using a third party service provider.

In the case of the paper invoice process, an invoicer 10 prepares a paper invoice 12, which is sent via mail to customer 20. After verifying that the invoice is correct customer 20 prepares a paper check 22 and returns the paper check 22 to invoicer 10. Invoicer 10 then credits the account of customer 20 and submits check 22 with its other business receipts to invoicer bank 30. Invoicer bank 30 then interacts with customer bank 40 via the well-known ACH network to demand the funds from customer's checking account and deposit those funds into the invoicer's checking account. This interaction follows a conventional, well known process represented by 32, 42.

As discussed above, some period may elapse before invoicer 10 receives check 22 from customer 20. This process can be expedited somewhat if the check is sent directly from customer 20 to invoicer bank 30. This "lock box" process takes place through the use of a post office box address on the invoice, which sends the check 22 to invoicer bank 30 even though the address on the invoice 12 may show the name of invoicer 10. In this modified process, after receiving check 22, invoicer bank 30 will still go through the ACH network 32, 42 before funds are credited to invoicer's account.

In an attempt to automate this process, third party service providers 54 have entered the scene. Here invoicer 10 transmits an electronic data stream 14 to service provider 54 containing all of the information that normally is contained in a paper invoice. There is then an electronic communication 52 between service provider 54 and customer 20 for the purpose of notifying customer 20 of the pending charge and, in some cases, allowing the customer to approve of the charge against its accounts. Service provider 54 then transmits payment authorization 52 to customer bank 40. At the same time, service provider 54 may also transmit a message 56 to invoicer 10 with notification of the payment authorization 52.

After receiving authorization 52, customer bank 40 then sends payment to invoicer bank 30 through conventional channels.

The non-bank service provider 54 may also be granted access to the ACH network to direct draft via PPD customer bank 40 on behalf of customer 20. In this case, service provider 54 may receive funds from the customer into the service provider checking account and then disperse those funds to invoicer 10.

Figure 112:
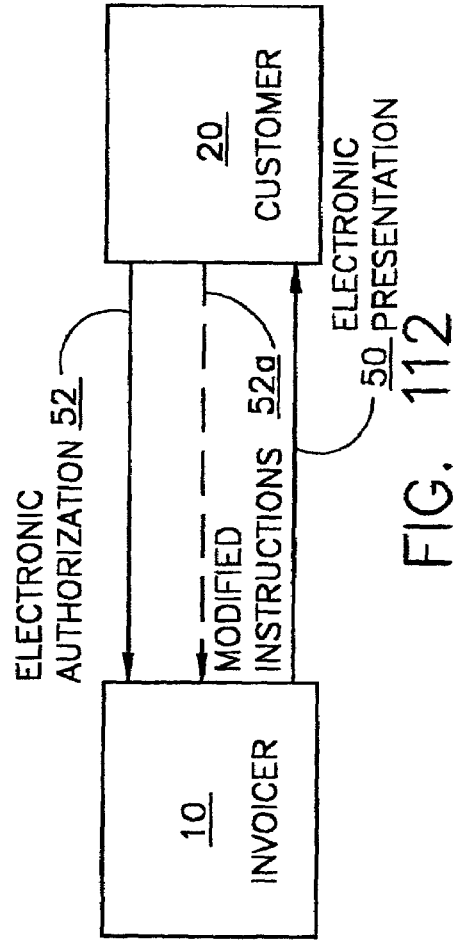
FIG. 112 is a schematic representation of a preferred payment engine method for electronic invoicing and paying performed according to present invention.

As can be seen from the complexity of FIG. 112, both the conventional paper invoice process and the third party service provider process are cumbersome, and time/labor intensive.

As best seen in FIG. 112, a method for electronic invoicing and paying is shown constructed according to the present invention. The method starts with the electronic presentment 50 of an invoice to customer 20. It should be understood that the term "presentment" as used herein does not include the specialized definition normally associated with commercial paper, i.e., the production of a negotiable instrument to a drawee. Rather, the term refers to providing via electronic means an "invoice" containing at least the same customer billing data typically included on a paper invoice. This electronic presentment may take place through the use of an Internet website, a bank ATM machine or through the use of a stand alone kiosk.

In a preferred embodiment, the invoice would also include, in addition to normal billing data, a request for payment instructions. This request provides the customer the opportunity to select either the bank account from which the invoice will be paid, or it provides the customer with the option to pay via a debit card, credit card, ATM, stored value card or some source of funds.

The invoice would include billing data such as the customer name, address, account number and e-mail address. The invoice may further include bill data typically included with a paper invoice to include the period covered by the invoice, a detail of the goods/services covered by the invoice, a total amount due and a payment due date.

In addition to the typical invoice information, the electronic invoice presentment may also include customer notices relating to changes in credit terms and the like. Invoicer 10 may also include sales and promotional materials informing customer 20 of new products or sales on existing products.

After electronic invoice presentment 50, the customer provides an electronic authorization 52 to the invoicer 10 permitting customer's account to be charged. This step eliminates the time and expense of preparing and mailing a paper check. Thus, invoicer 10 could be in a position to debit customer's bank account in as little as one day as opposed to the period required to receive a paper check 22.

The information included in this electronic authorization could include the invoice account number and an associated customer payment account. In a preferred embodiment, both these items of information are submitted simultaneously with the authorization. When pre-arranged instructions are made, this information does not need to re-submitted each time.

Prior to providing the authorization for payment, customer 20 is provided with a number of options for changing the payment instructions to create modified payment instruction 52a. These modifications can range from no modification at all in accepting all the payment terms contained in the presentment. Alternatively, customer 20 may be provided with any combination of the following options:

1) The customer may pay less than the amount due on the invoice for either unspecified reasons or for a specific reason such a dispute concerning a line item contained on the invoice.
2) The customer may elect to pay more than the amount due on the invoice.
3) The customer may elect to make a special payment, for example, an extra principal payment on a loan.
4) The customer may elect to change the date that the payment, via electronic transfer, will take place, provided that such date has not already passed.
5) The customer may change the source of funds for the payment, i.e., from a primary checking account to a pre-authorized credit card.

Making any of these changes discussed above requires that the customer be authorized to do so by the invoicer.

Figure 113A:
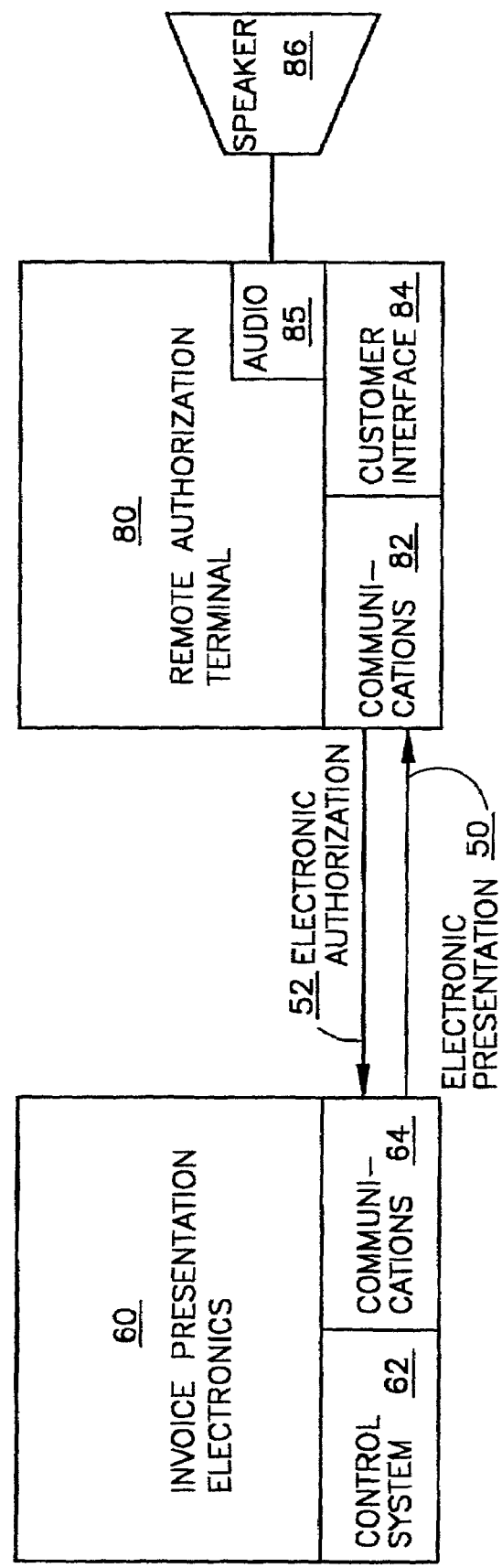
FIGS. 113A and 113B are schematic representations of a preferred payment engine electronic invoicing and payment system constructed according to the present invention.

The method described above may be carried out by an automated billing system depicted schematically in FIG. 113A which provides remote customer review of automated billing from an invoicer to include: (a) invoice presentation electronics 60 adapted to present customer billing data in request for payment instructions related to automated billing, and (b) an electronic customer authorization interface 84.

The customer interface receives customer billing data and request for payment instructions from the invoicer presentation electronics and provides those items to the customer. The interface also receives customer payment instructions in response to the request for payment instructions and transmits those instructions from the customer to the invoicer.

The invoice presentment electronics 60 may further include a control system 62 and first communication electronics 64. These components typically are located in an invoicer controlled facility.

At a customer facility, the system includes a remote authorization terminal 80 having second communication electronics 82 adapted to communicate with first electronic communications 64. Control system 62 coordinates the generation of the electronic invoice 50 containing at least all the billing information normally included on a traditional paper invoice along with a request for payment instructions. Control system then oversees the submission of that information from the first communication electronics 64 to the second communication electronics 82 for review by the customer.

Remote authorization terminal 80 is adapted to present the billing data to a customer and to an appropriate response relating to the billing data from the customer. The response indicates acceptance of the billing data without change for automated payment or modification of the billing data as described above. The customer interface 84 is further adapted to transmit this information to invoice presentment electronics 60.

The components of this system may be configured in a number of ways. For example, the customer accessible site may reside in an Internet website provided by invoicer for receiving the billing data and payment instructions from the customer. The website will be accessible from the customer electronic authorization interface 84. In this instance, the customer authorization interface 84 would include an Internet browser for accessing the customer accessible site.

Other alternatives for the electronic customer authorization interface include an automated teller machine (ATM), a remote kiosk, a personal computer, an interactive television device, or a telephone.

In the case of a telephone, the electronic customer authorization interface 84 could include either a well-known touch-tone telephone or a screen-based telephone.

In another embodiment, the electronic customer authorization interface 84 is a digital computer with the billing data and the payment request instructions presented by e-mail to the customer with an e-mail reply for relaying customer payment instructions 52 to the invoice presentation electronics 60. The electronic customer authorization interface 84 could also include a display for presenting billing data and the request for payment instructions along with a customer actuable input for receiving customer payment instructions.

In addition to the visual display, the electronic customer authorization interface 84 could further include audio electronics 85 and a speaker 86 for presenting billing data and request for payment instructions to the customer. In this embodiment, the customer actuable input for receiving customer payment instructions may also feature a customer-spoken input.

The electronic customer authorization interface 84 may also be adapted to allow a customer to poll the invoice presentment electronics 60 to receive billing data and payment request instructions.

The automated billing system of the present invention includes submitting billing data from an invoicer to a customer for remote customer review and acceptance/modification and the transmission of those items to the invoicer. The billing information 50 that may be submitted to the customer includes any combination of the following items:
- payment due date
- amount due
- detail of goods/services provided during a billing period
- late charges
- account information
- customer information to include customer name, customer address, and customer account identifier (the account identifier could include a customer number and/or an account number)
- invoice identifier, e.g., invoice number
- line item disputes
- multiple invoice payments The invoice presentment electronics 60 may include a memory device to store invoice information relating to customer bills and account information relating to financial institutions associated with the customer. That is, the customer may have the option of selecting from a number of accounts a specific account from which funds are drafted to pay the invoice.

The memory device and the invoice presentment electronics 60 may also include information relating to a pre-authorized payment instruction for automated payment of the billing amount set out in the billing information from an account set out in the account information. If pre-authorized payment instructions are used, the request for payment instructions 50 originating in the invoice presentment electronics 60 may query the customer for acceptance of those instructions with or without modification. To accomplish such a modification, the customer authorization interface 84 may further include an editor for modifying the pre-authorized payment instructions.

Figure 113B:
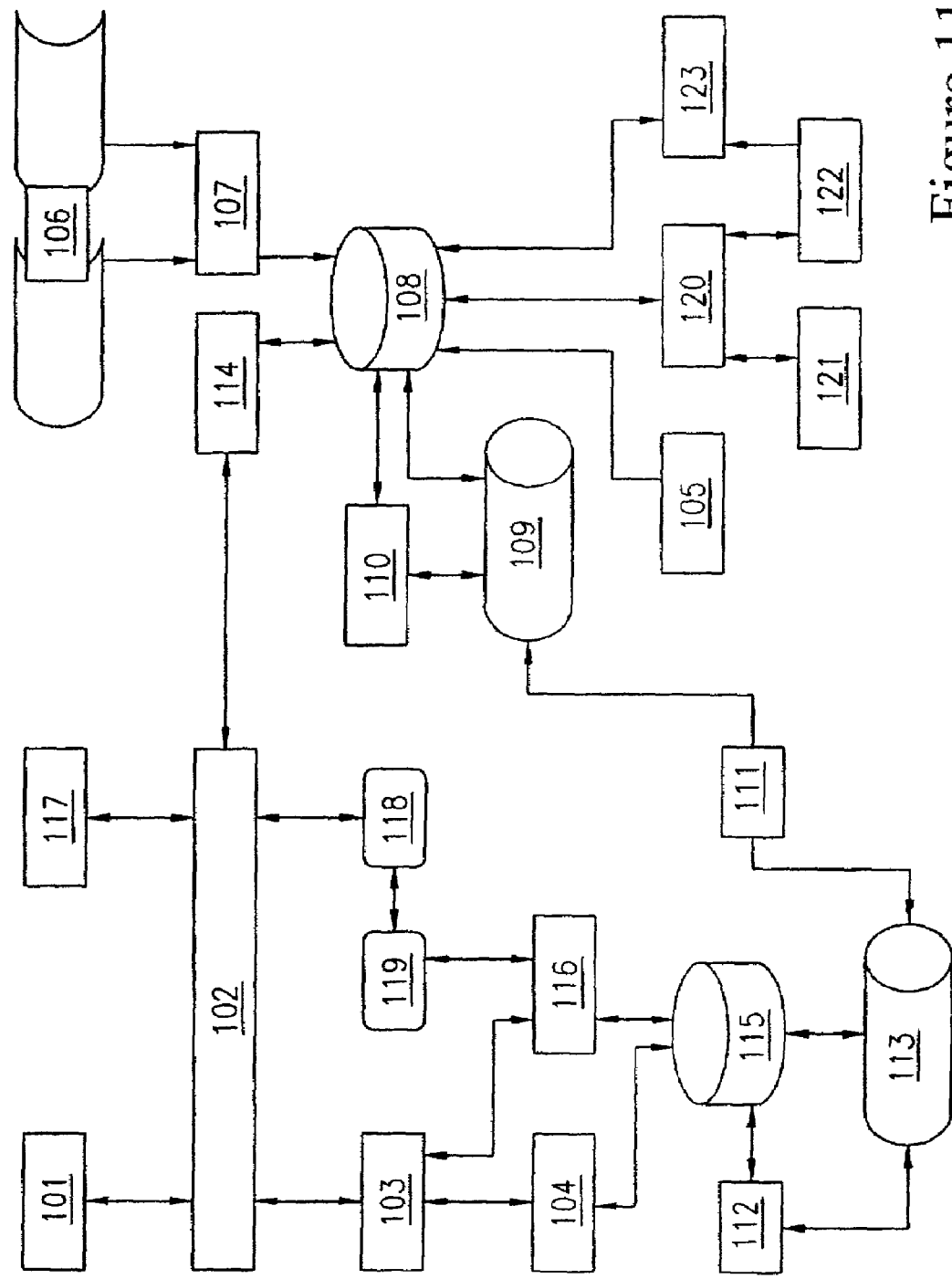

The overall operation of the present invention can best be understood by referring to FIG. 113B. The invoicer's customer can access the system through any remotely attached computing device 101 and communicates with the invoicer systems through a public or private network 102. A web server or communications processor of some kind 103 manages on-line communications between the customer and application systems that allow the customer to begin the provisioning process. The customer is presented electronically data input forms to complete by a provisioning application program 104 which also may validate whether the data input by the customer is valid according to the invoicer's records as contained in the Legacy systems. After determining whether customer and financial account records are accurate, the invoicer activates the customer for electronic invoice presentment and remittance.

An electronic mail message or traditional letter may be sent to the customer with information that allows the customer to access the system, such as an account number and/or password.

During the next invoicing cycle for this customer, appropriate data, such as Legacy print data and Legacy automatic payment 106 is acquired. Legacy print data is data that would normally be sent to a printer to prepare customers' invoices on paper. Legacy automatic payment data are records that are typically created by the invoicer that allow the invoicer to initiate payment based on pre-authorized arrangements with the customer. Payment records would include those formatted for automatic funds transfer from checking or savings accounts (ACH format data), debit transactions to credit cards, debit cards, or stored value cards. Files intended for transfer to ATM networks are also anticipated.

In acquiring the data for the product, Legacy data is sorted, parsed, extracted by an application program 107 and appropriate control data is maintained for reporting on operations. An application program 108 loads data into a relational database 109 for monthly processing. In the preferred embodiment, two separate computers may be used for additional security over sensitive financial data such as account numbers or authorization codes. As a further security measure, the invoicer may choose to configure the product using a computer 110 located behind the invoicer's firewall security device and connected by a secured network 111 to the web server hosting computer 112.

Invoice presentment data and subsets of data on financial arrangements are made available for presentment by transfer of data using immediate transfer, for example by way of an encrypted, remote stored procedure within the database 109 or by a batch transfer.

Once data to be made available electronically has been accurately loaded to the web server database 113, an application program 114 sends an electronic mail message to the customer announcing the availability of the monthly invoice and providing some summary of data. Since electronic mail account data may be invalid or services might be otherwise inoperative, the application program 114 is adapted to prepare data to be sent by the US Postal Service, fax or other means. A front-end processor 115 contains a template necessary to present the invoice and default payment arrangements 116 in the manner that the invoicer desires. The web server 103 hosts an interactive session in which the customer accesses their invoice. The customer may choose to modify pre-arranged payment arrangements. As an example, the customer may change the amount to pay, the date for payment and changing the source of funds for the payment, from a personal checking account to another invoicer-approved source, such as a credit card. These arrangements 114 are stored on the web server database 113.

In the preferred embodiment, the customer could also use a telephone 117 connected to a network 102 and a PBX telephone processing switch 118 to pass data to and from a voice response unit 119. The customer could call into hear information about his invoice and signal changes to pre-existing arrangements, either through touch-tone entry or speech recognition. These changes are processed by the front end processor 115 and recorded in the data base just like remote-computer-based entries.

On each day that the invoicer transfers payment data to banks or financial transaction processing services, an application program 120 is executed to identify customers in the web server database 113 that have payments scheduled. Data from the web server is transferred for processing on the second computer 110 and combined with the data containing the pre-authorized, payment arrangements, which was initially stored in the relational database 109. Based on the customer's instructions, records are modified or might be deleted and recreated if a change in funding source is requested. Data is then formatted to interface back the invoicer's Legacy systems 121, for example, simulating the normal file format for the invoicer's lockbox processing.

Data 122 is transferred to the invoicer's bank or to a third party that processes financial transactions. An application program 123 records those instances when a customer's data within a processing batch is returned for insufficient funds or incorrect account data so that the correct payment history for a customer can be maintained.

The security provisions of the product allow an exclusively invoicer-focused delivery of electronic invoice presentment and payment arrangements. Although the preferred embodiment anticipates that an invoicer may choose to outsource web server hosting or web server and remittance processing to an outside company on behalf of the invoicer, the service to customers would be provided so that the customer would not normally be aware that the invoicer was not actually operating the product directly.

Figure 103:
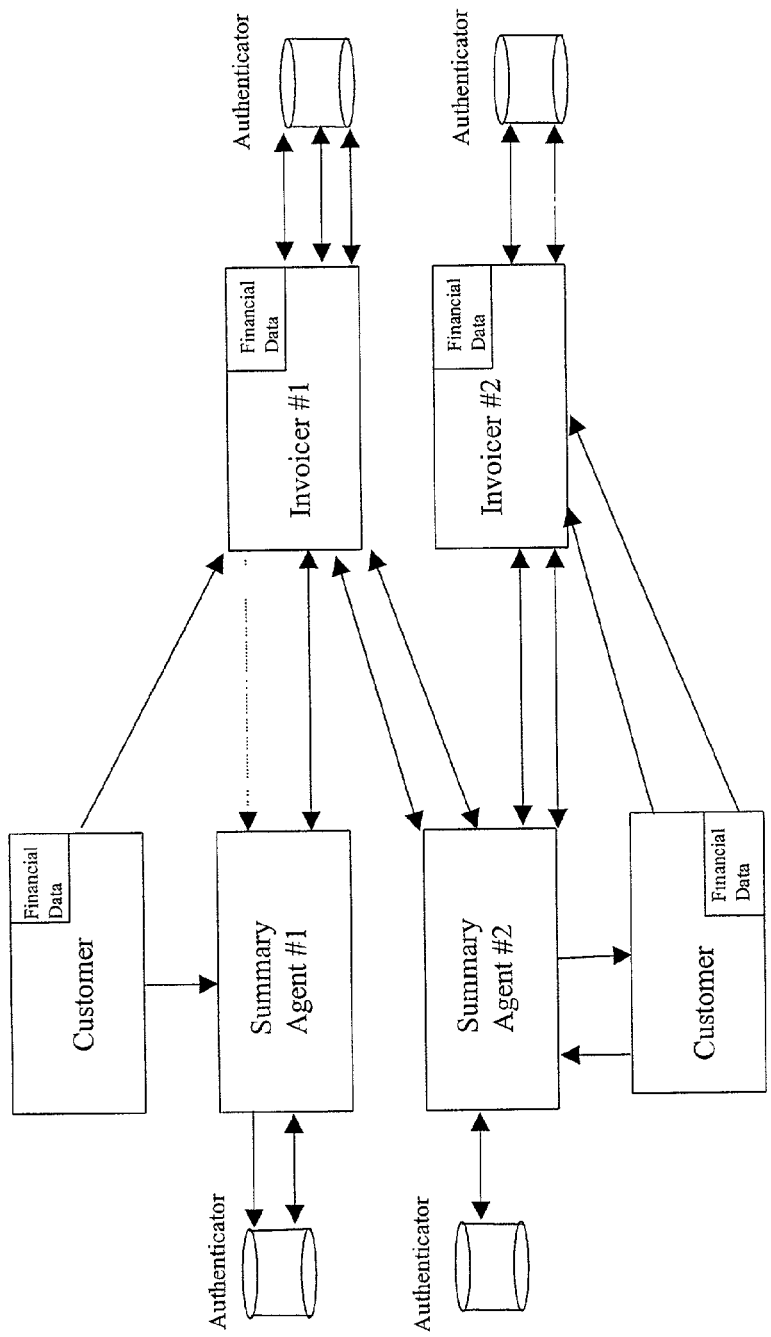
FIG. 103 is a schematic representation of a "thin portal" electronic invoicing and payment system constructed according to the present invention.

Certain modifications and improvements will occur to those skilled in the art upon a reading of the foregoing description. By way of example, FIG. 103 shows enrollment starting at the invoicer whereas as to create tokens, representing a name and password pair, and authentication information that customer initially recorded, but the present invention may also begin enrollment at the summary agent or the portal. Also, as used herein, the "invoicer" may also include an Accounts Payable site, which retrieves its information from more than one sub-invoicer and combines this information into a single invoice first. For example, a local telephone company may put together sub-invoices from itself, a separate long distance carrier and an Internet DSL service. It should be understood that all such modifications and improvements have been deleted herein for the sake of conciseness and readability but are properly within the scope of the following claims.

We claim:

1. An automated electronic invoicing and payment consolidation system for providing remote customer review of customer account information from at least two invoicers having web sites or entities having web sites for acting on behalf of said invoicers, said system comprising:
    (a) a consolidated invoicer interface wherein said invoicer interface includes: (i) at least one access point for at least one customer to each of the invoicers or entities acting on behalf of said invoicers; (ii) means for setting said access point of each of the invoicers or entities acting on behalf of said invoicers for at least one customer; and (iii) means for authentication of each of said customers;
    (b) a remote customer interface for accessing said consolidated invoicer interface, wherein said remote customer interface includes a dynamic inbox adapted to display a list of invoicers that is selectable for display in said dynamic inbox by the at least one customer;
    (c) a payment engine for electronically transmitting invoice payment instructions from the customer to each invoicer or entities acting on behalf of said invoicers; and
    (d) a data pulling component installable on said at least two invoicers' web sites or on web sites of entities working on behalf of said invoicers adapted to read each invoicer's data, package said invoicer's data and send said data to said remote customer interface in response to customer data requests.

2. The system according to claim 1, wherein said payment engine includes: invoice presentation electronics adapted to present an electronic invoice created by or on behalf of said invoicers from customer billing data stored on a server and only extracted by or on behalf of said invoicers for customer review and to request payment instructions relating to automated billing to said customer; and a remote electronic customer authorization interface adapted to: (i) receive the customer billing data for customer review and the request for payment instructions from said invoice presentation electronics; (ii) provide the customer billing data and the request for payment instructions to the customer; (iii) receive customer payment instructions from the customer in response to the request for payment instructions; and (iv) transmit the customer payment instructions from the customer to each of the invoicers or entities acting on behalf of said invoicers.

3. The system according to claim 2, wherein said payment source is a clearing house.

4. The system according to claim 3, wherein said clearing house is a courier.

5. The system according to claim 3, wherein said clearing house is a payment network.

6. The system according to claim 2, wherein said payment instructions include transmission date.

7. The system according to claim 2, wherein said payment instructions include amount to draft from customer associated financial institution.

8. The system according to claim 2, wherein said payment instructions include account information associated with the customer from which to draft payment.

9. The system according to claim 2, wherein said payment instructions include account information associated with each of the invoicers or entities acting on behalf of said invoicers from which to deposit payment.

10. The system according to claim 2, wherein said billing data includes invoicer billing information.

11. The system according to claim 10, wherein said billing information includes a due date.

12. The system according to claim 10, wherein said billing information includes an amount due.

13. The system according to claim 10, wherein said billing information includes a list of goods or services provided during a billing period.

14. The system according to claim 10, wherein said billing information includes a late charge.

15. The system according to claim 10, wherein said billing information includes account information.

16. The system according to claim 2, wherein said invoice presentment electronics further includes invoice information relating to customer bills and account information relating to financial institutions associated with the customer from which payments maybe drafted.

17. The system according to claim 16, wherein said invoice presentment electronics further includes preauthorized payment instructions for automated payment of a billing amount set out in said billing information from an account set out in said account information.

18. The system according to claim 17, wherein the request for payment instructions from said invoice presentment electronics query the customer if the preauthorized payment instructions are desired for the billing data presented.

19. The system according to claim 17, wherein the request for payment instructions from said invoice presentment electronics query the customer if the preauthorized payment instructions need modification for the billing data presented.

20. The system according to claim 17, wherein said customer authorization interface includes an editor for modifying the preauthorized payment instructions.

21. The system according to claim 16, wherein the account information includes account information from a plurality of financial institutions and the request for payment instructions query the customer to select the financial institution from which to draft payment for an associated customer bill.

22. The system according to claim 21, wherein said invoice presentment electronics includes a preauthorized default identifying the financial institution from which to draft payment for said associated customer bill.

23. The system according to claim 22, wherein said electronic customer authorization interface is adapted to receive a customer input to accept the preauthorized default.

24. The system according to claim 22, wherein said electronic customer authorization interface is adapted to receive a customer input to modify the preauthorized default.

25. The system according to claim 2, wherein said request for payment instructions include billing information selected from the group consisting of amount due, time of payment, account from which to draft payment.

26. The system according to claim 25, wherein said customer authorization interface is adapted to modify the billing information to change one or more of the group consisting of amount due, time of payment and account from which to draft payment.

27. The system according to claim 2, wherein said billing data include notices for the customer.

28. The system according to claim 2, wherein said billing data include advertising information directed towards the customer.

29. The system according to claim 2, wherein said billing data include control information.

30. The system according to claim 2, wherein said payment instructions include a date to draft payment.

31. The system according to claim 2, wherein said payment instructions include an amount of invoice.

32. The system according to claim 2, wherein each of the invoicers or entities acting on behalf of said invoicers provide a customer accessible site for receiving said billing data and said request for payment instructions, said site accessible from said electronic customer authorization interface.

33. The system according to claim 32, wherein said customer accessible site is an Internet site and said electronic customer authorization interface includes a browser for accessing said customer accessible site.

34. The system according to claim 32, wherein said electronic customer authorization interface is an automated teller machine.

35. The system according to claim 32, wherein said electronic customer authorization interface is a remote kiosk.

36. The system according to claim 32, wherein said electronic customer authorization interface is a personal computer.

37. The system according to claim 32, wherein said electronic customer authorization interface is an interactive television.

38. The system according to claim 32, wherein said electronic customer authorization interface is a telephone.

39. The system according to claim 32, wherein said electronic customer authorization interface is a computer, said billing data and said request for payment instructions are presented by e-mail to the customer and the customer payment instructions are provided by a customer e-mail.

40. The system according to claim 32, wherein said electronic customer authorization interface includes a display for presenting said billing data and said request for payment instructions and a customer actuable input for receiving customer payment instructions.

41. The system according to claim 32, wherein said electronic customer authorization interface includes audio electronics and a speaker for presenting said billing data and said request for payment instructions and a customer actuable input for receiving customer payment instructions.

42. The system according to claim 32, wherein said electronic customer authorization interface is adapted to allow a customer to poll said invoice presentment electronics to receive said billing data and said request for payment instructions.

43. The system according to claim 2, wherein said remote customer interface includes an access program and a server connection.

44. The system according to claim 43, wherein said access program is an Internet server.

45. The system according to claim 43, wherein said server connection is an Internet server connection.

46. The system according to claim 45, wherein said Internet server connection is an Internet dial-up connection.

47. The system according to claim 1, wherein said billing data includes customer information.

48. The system according to claim 47, wherein said customer information includes customer name.

49. The system according to claim 47, wherein said customer information includes customer address.

50. The system according to claim 47, wherein said customer information includes account information for the customer.

51. The system according to claim 1, wherein said billing data includes a customer account identifier.

52. The system according to claim 1, wherein said billing data includes an invoice identifier.

53. A consolidated invoicer interface for an automated electronic invoicing and payment system for providing remote customer review of customer account information from at least two invoicers having web sites or entities having web sites for acting on behalf of said invoicers, said system comprising:
  (a) at least one access point for at least one customer to each of the invoicers or entities acting on behalf of said invoicers, wherein said at least one access point includes a dynamic inbox adapted to display a list of invoicers that is selectable for display in said dynamic inbox by at least one customer;
  (b) means for setting said access point of each of the invoicers or entities acting on behalf of said invoicers for at least one customer;
  (c) means for authentication of each of said customers;
  (d) means for automatically requesting account information for said customers from each of the invoicers or entities acting on behalf of said invoicers;
  (e) means for electronically transmitting invoice payment instructions from said customers to each of the invoicers or entities acting on behalf of said invoicers; and
  (f) means at said invoicer's web site or entities' web site for acting on behalf of said invoicers for reading each invoicer's data, packaging said invoicer's data and sending said means for automatically requesting account information.

54. The system according to claim 53, wherein said at least one access point to one of the invoicers or entities acting on behalf of said invoicers is the invoicer's URL.

55. The system according to claim 53, wherein said at least one access point to one of the invoicers further includes a plurality of access points to each invoicer.

56. The system according to claim 53, wherein said each of said access points of each of said invoicer's are URL at a portal site.

57. The system according to claim 53, wherein the means for setting an access point of each of the invoicers or entities acting on behalf of said invoicers includes a transfer of invoicer's URL from invoicer's Web site.

58. The system according to claim 57, wherein the means for setting an access point of each of the invoicers or entities acting on behalf of said invoicers further includes a collection of access points for providing a directory of accessible portals and invoicers or entities acting on behalf of said invoicers.

59. The system according to claim 58, wherein said collection of access points includes at least one of an invoicer's URLs, portal URLs and payment engine URLs.

60. The system according to claim 53, wherein said means for setting the access point of each of the invoicers or entities acting on behalf of said invoicers further includes means for setting up payment of the customer.

61. The system according to claim 60, wherein said means for setting up the payment of the customer is at the portal.

62. The system according to claim 60, wherein said means for setting up the payment of the customer is a data entry point at the invoicer.

63. The system according to claim 60, wherein said means for setting up the payment of the customer is at the invoicer's payment engine.

64. The system according to claim 53, wherein the means for authentication is stored on a portal.

65. The system according to claim 64, wherein said means for authentication stored on portal is a name/password pair.

66. The system according to claim 64, wherein said means for authentication stored on portal further includes invoicer authentication.

67. The system according to claim 66, wherein said invoicer authentication is a name/password pair.

68. The system according to claim 53, wherein said means for authentication is invoicer authentication.

69. The system according to claim 68, wherein said invoicer authentication is stored on invoicer's site.

70. The system according to claim 69, wherein said invoicer authentication stored on invoicer's site is a name/password pair.

71. The system according to claim 53, wherein said means for automatically requesting customer account information is a URL request to invoicer's Web site.

72. The system according to claim 53, wherein said customer account information includes invoicer content.

73. The system according to claim 72, wherein said content includes at least one of the following: current bill "summary", billing/payment history "summary", invoicer notice/messages "summary", notes or detail.

74. The system according to claim 53, wherein said customer account information includes purchase orders.

75. The system according to claim 53, wherein said customer account information includes shipping documents.

76. The system according to claim 53, wherein the data format of said customer account information is at least one of the following: XML, EDI, graphic, text and IFX/OFX.

77. An automated electronic invoicing and payment consolidation system for providing remote customer review of customer account information from at least two invoicers having web sites or entities having web sites for acting on behalf of said invoicers, said system comprising:
(a) a consolidated invoicer interface wherein said invoicer interface includes: (i) at least one access point for at least one customer to each of the invoicers or entities acting on behalf of said invoicers; (ii) means for setting said access point of each of the invoicers or entities acting on behalf of said invoicers for at least one customer; (iii) means for authentication of each of said customers; and (iv) means for automatically requesting account information for said customers from each of the invoicers or entities acting on behalf of said invoicers;
(b) a remote customer interface for accessing said consolidated invoicer interface, wherein said remote customer interface includes a dynamic inbox adapted to display a list of invoicers that is selectable for display in said dynamic inbox by the at least one customer;
(c) a payment engine wherein the customer payment instructions are sent from the customer to each of the invoicers or entities acting on behalf of said invoicers, said payment engine including: invoice presentation electronics adapted to present an electronic invoice created by or on behalf of said invoicers from customer billing data stored on a server and only extracted by or on behalf of said invoicers for customer review and to request payment instructions relating to automated billing to said customer; and a remote electronic customer authorization interface adapted to: (i) receive the customer billing data for customer review and the request for payment instructions from said invoice presentation electronics; (ii) provide the customer billing data and the request for payment instructions to the customer; (iii) receive customer payment instructions from the customer in response to the request for payment instructions; and (iv) transmit the customer payment instructions from the customer to each of the invoicers or entities acting on behalf of said invoicers; and
(d) a data pulling component installable on said at least two invoicers' web sites or on web sites of entities working on behalf of said invoicers adapted to read each invoicer's data, package said invoicer's data and send said data to said remote customer interface in response to customer data requests.

78. The system according to claim 77, wherein said payment source is a clearing house.

79. The system according to claim 78, wherein said clearing house is a courier.

80. The system according to claim 78, wherein said clearing house is a payment network.

81. The system according to claim 77, wherein said payment instructions include transmission date.

82. The system according to claim 77, wherein said payment instructions include amount to draft from customer associated financial institution.

83. The system according to claim 77, wherein said payment instructions include account information associated with the customer from which to draft payment.

84. The system according to claim 77, wherein said payment instructions include account information associated with each of the invoicers or entities acting on behalf of said invoicers from which to deposit payment.

85. The system according to claim 77, wherein said billing data includes invoicer billing information.

86. The system according to claim 85, wherein said billing information includes a due date.

87. The system according to claim 85, wherein said billing information includes an amount due.

88. The system according to claim 85, wherein said billing information includes a list of goods or services provided during a billing period.

89. The system according to claim 85, wherein said billing information includes a late charge.

90. The system according to claim 85, wherein said billing information includes account information.

91. The system according to claim 77, wherein said billing data includes customer information.

92. The system according to claim 91, wherein said customer information includes customer name.

93. The system according to claim 91, wherein said customer information includes customer address.

94. The system according to claim 91, wherein said customer information includes account information for the customer.

95. The system according to claim 77, wherein said billing data includes a customer account identifier.

96. The system according to claim 77, wherein said billing data includes an invoice identifier.

97. The system according to claim 77, wherein said invoice presentment electronics further includes invoice information relating to customer bills and account information relating to financial institutions associated with the customer from which payments may be drafted.

98. The system according to claim 97, wherein said invoice presentment electronics further includes preauthorized payment instructions for automated payment of a billing amount set out in said billing information from an account set out in said account information.

99. The system according to claim 98, wherein the request for payment instructions from said invoice presentment electronics query the customer if the preauthorized payment instructions are desired for the billing data presented.

100. The system according to claim 98, wherein the request for payment instructions from said invoice presentment electronics query the customer if the preauthorized payment instructions need modification for the billing data presented.

101. The system according to claim 98, wherein said customer authorization interface includes an editor for modifying the preauthorized payment instructions.

102. The system according to claim 97, wherein the account information includes account information from a plurality of financial institutions and the request for payment instructions query the customer to select the financial institution from which to draft payment for an associated customer bill.

103. The system according to claim 102, wherein said invoice presentment electronics includes a preauthorized default identifying the financial institution from which to draft payment for said associated customer bill.

104. The system according to claim 103, wherein said electronic customer authorization interface is adapted to receive a customer input to accept the preauthorized default.

105. The system according to claim 103, wherein said electronic customer authorization interface is adapted to receive a customer input to modify the preauthorized default.

106. The system according to claim 77, wherein said request for payment instructions include billing information selected from the group consisting of amount due, time of payment, account from which to draft payment.

107. The system according to claim 106, wherein said customer authorization interface is adapted to modify the billing information to change one or more of the group consisting of amount due, time of payment and account from which to draft payment.

108. The system according to claim 77, wherein said billing data include notices for the customer.

109. The system according to claim 77, wherein said billing data include advertising information directed towards the customer.

110. The system according to claim 77, wherein said billing data include control information.

111. The system according to claim 77, wherein said payment instructions include a date to draft payment.

112. The system according to claim 77, wherein said payment instructions include an amount of invoice.

113. The system according to claim 77, wherein each of the invoicers or entities acting on behalf of said invoicers provide a customer accessible site for receiving said billing data and said request for payment instructions, said site accessible from said electronic customer authorization interface.

114. The system according to claim 113, wherein said customer accessible site is an Internet site and said electronic customer authorization interface includes a browser for accessing said customer accessible site.

115. The system according to claim 113, wherein said electronic customer authorization interface is an automated teller machine.

116. The system according to claim 113, wherein said electronic customer authorization interface is a remote kiosk.

117. The system according to claim 113, wherein said electronic customer authorization interface is a personal computer.

118. The system according to claim 113, wherein said electronic customer authorization interface is an interactive television.

119. The system according to claim 113, wherein said electronic customer authorization interface is a telephone.

120. The system according to claim 113, wherein said electronic customer authorization interface is a computer, said billing data and said request for payment instructions are presented by e-mail to the customer and the customer payment instructions are provided by a customer e-mail.

121. The system according to claim 113, wherein said electronic customer authorization interface includes a display for presenting said billing data and said request for payment instructions and a customer actuable input for receiving customer payment instructions.

122. The system according to claim 113, wherein said electronic customer authorization interface includes audio electronics and a speaker for presenting said billing data and said request for payment instructions and a customer actuable input for receiving customer payment instructions.

123. The system according to claim 113, wherein said electronic customer authorization interface is adapted to allow a customer to poll said invoice presentment electronics to receive said billing data and said request for payment instructions.

124. The system according to claim 77, wherein said remote customer interface includes an access program and a server connection.

125. The system according to claim 124, wherein said access program is an Internet server.

126. The system according to claim 124, wherein said server connection is an Internet server connection.

127. The system according to claim 126, wherein said Internet server connection is an Internet dial-up connection.

128. The system according to claim 77, wherein said at least one access point to one of the invoicers is the invoicer's URL.

129. The system according to claim 77, wherein said at least one access point to one of the invoicers or entities acting on behalf of said invoicers further includes a plurality of access points to each invoicer.

130. The system according to claim 77, wherein said each of said access points of each of said invoicer's are a URL at a portal site.

131. The system according to claim 77, wherein the means for setting an access point of each of the invoicers or entities acting on behalf of said invoicers includes a transfer of invoicer's URL from invoicer's Web site.

132. The system according to claim 131, wherein the means for setting an access point of each of the invoicers or entities acting on behalf of said invoicers further includes a collection of access points for providing a directory of accessible portals and invoicers or entities acting on behalf of said invoicers.

133. The system according to claim 132, wherein said collection of access points includes at least one of an invoicer's URLs, portal URLs and payment engine URLs.

134. The system according to claim 77, wherein said means for setting the access point of each of the invoicers or entities acting on behalf of said invoicers further includes means for setting up payment of the customer.

135. The system according to claim 134, wherein said means for setting up the payment of the customer is at the portal.

136. The system according to claim 134, wherein said means for setting up the payment of the customer is a data entry point at the invoicer.

137. The system according to claim 134, wherein said means for setting up the payment of the customer is at the invoicer's payment engine.

138. The system according to claim 77, wherein the means for authentication is stored on a portal.

139. The system according to claim 138, wherein said means for authentication stored on portal is a name/password pair.

140. The system according to claim 138, wherein said means for authentication stored on portal further includes invoicer authentication.

141. The system according to claim 140, wherein said invoicer authentication is a name/password pair.

142. The system according to claim 77, wherein said means for authentication is invoicer authentication.

143. The system according to claim 142, wherein said invoicer authentication is stored on invoicer's site.

144. The system according to claim 143, wherein said invoicer authentication stored on invoicer's site is a name/password pair.

145. The system according to claim 77, wherein said means for automatically requesting customer account information is a URL request to invoicer's Web site.

146. The system according to claim 77, wherein said customer account information includes invoicer content.

147. The system according to claim 146, wherein said content includes at least one of the following: current bill "summary", billing/payment history "summary", invoicer notice/messages "summary", notes or detail.

148. The system according to claim 77, wherein said customer account information includes purchase orders.

149. The system according to claim 77, wherein said customer account information includes shipping documents.

150. The system according to claim 77, wherein the data format of said customer account information is at least one of the following: XML, EDI, graphic, text and IFX/OFX.

151. A method for automated electronic invoicing and payment consolidation for providing remote customer review of customer account information from at least two invoicers having web sites or entities having web sites for acting on behalf of said invoicers, said method comprising the steps of:
(a) providing a consolidated invoicer interface wherein said invoicer interface includes: (i) at least one access point for at least one customer to each of the invoicers or entities acting on behalf of said invoicers; (ii) means for setting said access point of each of the invoicers or entities acting on behalf of said invoicers for at least one customer; (iii) means for authentication of each of said customers; and (iv) a dynamic inbox adapted to display a list of invoicers that is selectable for display in said dynamic inbox by the at least one customer;
(b) accessing said consolidated invoicer interface through a remote customer interface;
(c) electronically transmitting invoice payment instructions from the customer to each invoicer or entities acting on behalf of said invoicers
(d) installing a data pulling component on said at least two invoicers' web sites or on web sites of entities working on behalf of said invoicers; and
(e) reading each invoicer's data using said data pulling component, packaging said invoicer's data and sending said data to said remote customer interface in response to customer data requests using said data pulling component.

152. A method for automated electronic invoicing and payment consolidation for providing remote customer review of customer account information from at least two invoicers having web sites or entities having web sites for acting on behalf of said invoicers using a consolidated invoicer interface, said method comprising the steps of:
(a) providing at least one access point for at least one customer to each of the invoicers or entities acting on behalf of said invoicers, wherein said at least one access point includes a dynamic inbox adapted to display a list of invoicers that is selectable for display in said dynamic inbox by at least one customer;
(b) setting said access point of each of the invoicers or entities acting on behalf of said invoicers for at least one customer;
(c) authenticating each of said customers;
(d) automatically requesting account information for said customers from each of the invoicers or entities acting on behalf of said invoicers;
(e) electronically transmitting invoice payment instructions from the customer to each of the invoicers or entities acting on behalf of said invoicers;
(f) installing a data pulling component on said at least two invoicers' web sites or on web sites of entities working on behalf of said invoicers; and
(g) reading each invoicer's data using said data pulling component, packaging said invoicer's data and sending said data to said remote customer interface in response to customer data requests using said data pulling component.

153. A method for automated electronic invoicing and payment consolidation for providing remote customer review of customer account information from at least two invoicers having a web site or entities having a web site for acting on behalf of said invoicers, said method comprising the steps of:
(a) providing a consolidated invoicer interface wherein said invoicer interface includes: (i) at least one access point for at least one customer to each of the invoicers or entities acting on behalf of said invoicers; (ii) means for setting said access point of each of the invoicers or entities acting on behalf of said invoicers for at least one customer; (iii) means for authentication of each of said customers; (iv) means for automatically requesting account information for said customers from each of the invoicers or entities acting on behalf of said invoicers; and (v) a dynamic inbox adapted to display a list of invoicers that is selectable for display in said dynamic inbox by the at least one customer;
(b) installing a data pulling component on said at least two invoicers' web sites or on web sites of entities working on behalf of said invoicers; and
(c) reading each invoicer's data using said data pulling component, packaging said invoicer's data and sending said data to said remote customer interface in response to customer data requests using said data pulling component; and (d) sending the customer payment instructions from the customer to each of the invoicers or entities acting on behalf of said invoicers using a payment engine including: invoice presentation electronics adapted to present an electronic invoice created by or on behalf of said invoicers from customer billing data stored on a server and only extracted by or on behalf of said invoicers for customer review and to request payment instructions relating to automated billing to said customer; and a remote electronic customer authorization interface adapted to: (i) receive the customer billing data for customer review and the request for payment instructions from said invoice presentation electronics; (ii) provide the customer billing data and the request for payment instructions to the customer; (iii) receive customer payment instructions from the customer in response to the request for payment instructions; and (iv) transmit the customer payment instructions from the customer to each of the invoicers or entities acting on behalf of said invoicers.

* * * * *

UNITED STATES PATENT AND TRADEMARK OFFICE
CERTIFICATE OF CORRECTION

PATENT NO. : 7,702,579 B2
APPLICATION NO. : 09/741620
DATED : April 20, 2010
INVENTOR(S) : Neely et al.

It is certified that error appears in the above-identified patent and that said Letters Patent is hereby corrected as shown below:

In Column 4, Line 10, the word fall should be full

In Column 14, Line 62, Fig. 112 should be Fig. 111

In Column 28, Line 5, there should be a ; after the word invoicers

Signed and Sealed this

First Day of June, 2010

David J. Kappos
*Director of the United States Patent and Trademark Office*